United States Patent
Li et al.

(10) Patent No.: US 12,549,473 B2
(45) Date of Patent: Feb. 10, 2026

(54) METHOD, DEVICE, AND SYSTEM FOR IMPLEMENTING SERVICE PATH DETECTION

(71) Applicant: Huawei Technologies Co., Ltd., Shenzhen (CN)

(72) Inventors: Zuqing Li, Shenzhen (CN); Pingwei Fan, Nanjing (CN); Xun Hu, Nanjing (CN); Ping'an Yang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 379 days.

(21) Appl. No.: 18/186,631

(22) Filed: Mar. 20, 2023

(65) Prior Publication Data

US 2023/0261979 A1    Aug. 17, 2023

Related U.S. Application Data

(63) Continuation of application No. PCT/CN2021/118135, filed on Sep. 14, 2021.

(30) Foreign Application Priority Data

Sep. 21, 2020   (CN) .......................... 202010992436.9
Nov. 30, 2020   (CN) .......................... 202011375770.6

(51) Int. Cl.
*H04L 45/00*        (2022.01)
*H04L 43/0811*      (2022.01)
(Continued)

(52) U.S. Cl.
CPC .......... *H04L 45/26* (2013.01); *H04L 43/0811* (2013.01); *H04L 45/28* (2013.01); *H04L 45/745* (2013.01)

(58) Field of Classification Search
CPC ....... H04L 45/22; H04L 45/247; H04L 45/26; H04L 43/0805; H04L 43/0811;
(Continued)

(56) References Cited

U.S. PATENT DOCUMENTS 9,497,107 B1 *  11/2016  Akiya ................. H04L 43/0811
2010/0023632 A1 *  1/2010  Liu ..................... H04L 12/4633
                                                          709/230
(Continued)

FOREIGN PATENT DOCUMENTS

CN        102282805 A       12/2011
CN        110971433 A        4/2020
(Continued)

OTHER PUBLICATIONS

IEEE Std 802.1ag™—2007, IEEE Computer Society, LAN/MAN Standards Committee, "Amendment 5: Connectivity Fault Management", Dec. 17, 2007, total 260 pages.
(Continued)

*Primary Examiner* — Mohamed A Kamara
(74) *Attorney, Agent, or Firm* — Slater Matsil, LLP

(57) ABSTRACT

A method, a device, and a system for implementing service path detection are provided. The method is applied to an SRv6 network, and includes: A first network device generates a first packet based on IPv6 and sends the first packet to a second network device, where the first packet includes a first indication and identification information of a service, and the first indication indicates that the first packet is a detection packet; and after receiving the first packet, the second network device detects, based on the first indication and the identification information of the service, a path for carrying the service.

20 Claims, 15 Drawing Sheets

(51) Int. Cl.
*H04L 45/28* (2022.01)
*H04L 45/745* (2022.01)

(58) Field of Classification Search
CPC ..... H04L 43/0823; H04L 45/28; H04L 45/34; H04L 45/74; H04L 45/745; H04L 12/4633; H04L 41/0654; H04L 41/0668
See application file for complete search history.

(56) References Cited

U.S. PATENT DOCUMENTS

| | | |
|---|---|---|
| 2011/0222412 A1 | 9/2011 | Kompella |
| 2015/0263940 A1 | 9/2015 | Kini et al. |
| 2018/0077051 A1* | 3/2018 | Nainar ................. H04L 45/745 |
| 2023/0216780 A1* | 7/2023 | Chen ....................... H04L 45/00 370/216 |

FOREIGN PATENT DOCUMENTS

| | | | |
|---|---|---|---|
| JP | 2016522646 A | 7/2016 | |
| WO | 2019184752 A1 | 10/2019 | |

OTHER PUBLICATIONS

ITU-T Telecommunication Standardization Sector of ITU, Y. 1731, Series Y: Global Information Infrastructure, Internet Protocol Aspects and Next-Generation Networks, "OAM functions and mechanisms for Ethernet based networks", May 2006, total 80 pages.

\* cited by examiner

Packet 2

Packet 2

Packet 2

Packet 2

METHOD, DEVICE, AND SYSTEM FOR IMPLEMENTING SERVICE PATH DETECTION

CROSS-REFERENCE TO RELATED APPLICATIONS

This application is a continuation of International Application No. PCT/CN2021/118135, filed on Sep. 14, 2021, which claims priority to Chinese Patent Application No. 202010992436.9, filed on Sep. 21, 2020 and Chinese Patent Application No. 202011375770.6, filed on Nov. 30, 2020. All of the aforementioned patent applications are hereby incorporated by reference in their entireties.

TECHNICAL FIELD

This application relates to the field of communication technologies, and in particular, to a method, a device, and a system for implementing service path detection.

BACKGROUND

In a segment routing over internet protocol version 6 (SRv6) network, tunnel-level fault detection can be implemented currently. For example, if a customer provider edge (PE) device detects that a tunnel between the customer PE device and a network-side PE device is faulty, the customer PE device implements tunnel-level switching, to ensure normal running of a service originally carried on the tunnel. However, a granularity of tunnel-level fault detection is coarse. Once the fault is caused by a service, and another service carried on the tunnel can run normally, this fault detection manner cannot accurately detect a service-level fault. As a result, the customer PE device switches all services carried on the tunnel, in other words, a service normally running on the tunnel is also mistakenly switched. Consequently, network resources are wasted.

Based on this, it is urgent to provide a service-level path detection method in this scenario, to implement finer-grained and more accurate path detection, and further ensure accurate service switching.

SUMMARY

Embodiments of this application provide a method, a device, and a system for implementing service path detection. A network device sends a detection packet carrying an indication, so that a network device that receives the packet can accurately distinguish the detection packet from a service packet by using the indication. This ensures that the receiver network device can effectively implement service-level fault detection, to ensure normal running of a service in a network.

The following method, apparatus, device, and system that are provided in this application can be applied to an SRv6 network.

According to a first aspect, an embodiment of this application provides a method for implementing service path detection. The method is applied to a first network device. For example, the method may include: The first network device generates a first packet based on the internet protocol version 6 (IPv6), and sends the first packet to a second network device, where the first packet includes a first indication and identification information of a service, and the first indication indicates that the first packet is a detection packet; and the first network device sends the first packet to the second network device, to indicate the second network device that receives the first packet to detect, based on the first indication and the identification information of the service, at least one of a path that is between the first network device and the second network device and that is used to carry the service and a path that is between the second network device and an access-side network device and that is used to carry the service. Detection performed by the second network device on the path for carrying the service may be path status detection, for example, path fault detection or path quality detection. It can be learned that, according to the method, a sender network device adds the first indication and the identification information of the service to the sent detection packet, so that a receiver network device can accurately determine that the received packet is a detection packet and perceive corresponding service information, to perform, based on the detection packet, connectivity detection, quality detection, or the like on a to-be-detected path for carrying the service. This resolves problems that a requirement cannot be met and network resources are wasted. The problems are caused because only coarse-grained tunnel-level detection between the network devices can be completed currently. In this way, finer-grained and more accurate service-level detection is implemented, an accurate basis is provided for service-level path switching, and normal and efficient running of a service in a network is ensured.

The to-be-detected path may be at least one of the path that is between the first network device and the second network device and that is used to carry the service and the path that is between the second network device and the access-side network device and that is used to carry the service. A specific path to be detected and specific content of detection may be determined based on detection information carried in the detection packet. When the to-be-detected path includes both the path that is between the first network device and the second network device and that is used to carry the service and the path that is between the second network device and the access-side network device and that is used to carry the service, it may alternatively be considered that the to-be-detected path is a path range between the first network device and the access-side network device. Detection content for the to-be-detected path may include a status of an object such as an interface, a link, or a device on the path, for example, a fault status, or may include a quality status of data transmitted on the path, for example, statistics or analysis performed from aspects such as a packet loss, a delay, a bit error, or a jitter. The second network device may send the detection content to the first network device, so that the first network device determines a detection result, or can locally obtain the detection result based on the detection content.

The identification information of the service may be carried in a first IPv6 header or a first IPv6 extension header of the first packet. The identification information of the service may be, for example, a virtual private network segment identifier (VPN SID) corresponding to the second network device.

The first indication may be carried in the first IPv6 header or the first IPv6 extension header of the first packet. The following describes, by using examples, various possible implementations in which the first packet carries the first indication.

In a possible implementation, the first packet may include the first IPv6 header, and the first indication is carried in a next header field in the first IPv6 header. This implementation is applicable to an SRv6 best effort (BE) scenario.

Alternatively, the first packet may include the first IPv6 extension header, and the first indication is carried in a next header field in a first segment routing header (SRH) of the first IPv6 extension header. This implementation is applicable to an SRv6 policy scenario. For example, if a value of the next header field for carrying the first indication in the first packet is 137, it indicates that the first packet is a detection packet.

In this implementation, the first IPv6 extension header of the first packet may further include an alert label and a control word, the alert label and the control word indicate detection information in a payload of the first packet, and the detection information indicates the second network device to detect, based on the detection information, the path for carrying the service. That the alert label and the control word indicate the detection information may be determining, based on values of the alert label and the control word, that subsequently carried content is detection information, or determining, based on values of the alert label and the control word, that subsequently carried content is detection information and determining a type of the detection information. For example, based on an alert label 13 and the control word, it may be determined that the subsequently carried content is detection information and a type of the detection information is bidirectional forwarding detection (BFD) information.

In another possible implementation, the first packet may include the first IPv6 header, and the first indication is carried in an arguments (args) field in a first destination address (DA) field in the first IPv6 header. This implementation is applicable to an SRv6 BE scenario. Alternatively, the first packet may include the first IPv6 extension header, and the first indication is carried in an args field in a first DA field in a first SRH of the first IPv6 extension header. This implementation is applicable to an SRv6 policy scenario. For example, if a value of the args field in the DA field for carrying the first indication in the first packet is not equal to 0 (for example, the value of args is equal to 3), it indicates that the first packet is a detection packet.

In still another possible implementation, the first packet may include the first IPv6 extension header, and the first indication may be carried in a flags field in an SRH of the first IPv6 extension header. For example, if a value of the flags field for carrying the first indication in the first packet is not equal to 0 (for example, the value is equal to 1), it indicates that the first packet is a detection packet.

In yet another possible implementation, the first packet may include the first IPv6 extension header, and the first indication may be carried in a type-length-value (TLV) field in a hop-by-hop (HBH) option header of the first IPv6 extension header, or carried in a TLV field in a destination option header (DOH) of the first IPv6 extension header. For example, if an HBH option header field in the first packet includes the TLV field for carrying the first indication, it indicates that the first packet is a detection packet. For another example, if a DOH field in the first packet includes the TLV field for carrying the first indication, it indicates that the first packet is a detection packet.

In some possible implementations, the method may further include: The first network device sends a second packet to the second network device, where the second packet is a service packet used to carry the service, and the second packet does not include the first indication. In this way, after receiving the first packet and the second packet, the second network device can determine, based on an indication carried in the packet, whether the packet is a detection packet or a service packet, to perform corresponding processing based on a specific packet type.

In an example, that the second packet does not include the first indication may mean that the second packet does not include a field used to carry the first indication. For example, assuming that the HBH option header field in the first packet includes the TLV field for carrying the first indication, an HBH option header in the second packet does not include the TLV field used to carry the first indication. For another example, assuming that the DOH field in the first packet includes the TLV field for carrying the first indication, a DOH field in the second packet does not include the TLV field used to carry the first indication.

In another example, that the second packet does not include the first indication may alternatively mean that the second packet includes a field for carrying the first indication, but a value of the field in the first packet is different from a value of the field in the second packet, and the values are used to carry different indications. The value of the field in the first packet is used to carry the first indication, and the first indication indicates that the first packet is a detection packet. The value of the field in the second packet is used to carry a second indication, and the second indication indicates that the second packet is a service packet. In a case, assuming that the second packet includes a second IPv6 header, the second indication is carried in a next header field in the second IPv6 header, and the first indication is a first value of the next header field in the first IPv6 header, the second indication may be a second value (where the first value is not equal to the second value) of the next header field in the second IPv6 header. Alternatively, assuming that the second packet includes a second IPv6 extension header, the second indication is carried in a next header field in a second SRH of the second IPv6 extension header, and the first indication is a first value of the next header field in the first SRH of the first IPv6 extension header, the second indication may be a second value of the next header field in the second SRH. For example, if a value of the next header field for carrying the first indication in the first packet is 137, it indicates that the first packet is a detection packet. If a value of the next header field for carrying the second indication in the second packet is 143, it indicates that the second packet is a service packet. In another case, assuming that the second packet includes a second IPv6 header, the second indication is carried in an args field in a second DA field in the second IPv6 header, and the first indication is a third value of the args field in the first DA field in the first IPv6 header, the second indication may be a fourth value (where the third value is not equal to the fourth value) of the args field in the second DA field. Alternatively, assuming that the second packet includes a second IPv6 extension header, the second indication is carried in an args field in a second DA field in a second SRH of the second IPv6 extension header, and the first indication is a third value of the args field in the first DA field in the first SRH of the first IPv6 extension header, the second indication may be a fourth value of the args field in the second DA field in the second SRH. For example, if a value of the args field in the DA field for carrying the first indication in the first packet is 3, it indicates that the first packet is a detection packet. If a value of the args field in the DA field for carrying the second indication in the second packet is 0, it indicates that the second packet is a service packet. In still another case, assuming that the second packet includes a second IPv6 extension header, the second indication is carried in a flags field in an SRH of the second IPv6 extension header, and the first indication is a fifth value of the flags field in the SRH of the first IPv6 extension header, the second indication may be a sixth value (where the fifth value is not equal to the sixth value) of the flags field in the SRH of the second IPv6 extension header.

The first packet sent by the first network device to the second network device carries the first indication and the identification information of the service, and an objective in a first packet sending phase is to enable the second network device to detect, based on the first indication and the identification information of the service, the path for carrying the service. However, whether the second network device really receives the first packet is not limited.

In an example, when a link or a device between the first network device and the second network device is faulty, and the second network device is faulty, the second network device may fail to receive the first packet. Therefore, the first network device does not receive, within preset duration, a response packet sent by the second network device, and may determine that the path for carrying the service is faulty. In this example, because a status of the forwarding path between the first network device and the second network device is unpredictable in the first packet sending phase, the second network device actually cannot normally receive the first packet in some possible cases including a fault scenario listed in this example. However, this does not affect the objective of the first network device in the first packet sending phase, where the objective is to enable the second network device to detect, based on the first indication and the identification information of the service, the path for carrying the service.

In another example, assuming that the second network device receives the first packet, content that can be perceived and detected by the second network device may include: whether a link or an interface used by the second network device to connect to the access-side network device on the path is faulty. In another possible case, the second network device can further determine, in some manners, whether an access-side network connected to the second network device is faulty, for example, whether the access-side network device directly or indirectly connected to the second network device, or a link or a port in the access-side network is faulty. The access side mentioned herein may also be referred to as a customer in some cases. In this example, in a case, the second network device may choose not to respond to the first packet when determining that the interface or the link used by the second network device to connect to the access-side network device is faulty. In this case, the first network device does not receive, within the preset duration, the response packet sent by the second network device, and may determine that a path that is between the first network device and the access-side network device and that is for carrying the service is faulty. In another case, the second network device may choose to generate a response corresponding to the first packet and send the response to the first network device. In this case, when receiving the response packet sent by the second network device, the first network device may determine, based on link status information or interface status information carried in the response packet, whether the path carrying the service is faulty, for example, determine that the path that is between the second network device and the access-side network device and that is used to carry the service is faulty.

In still another example, assuming that the second network device receives the first packet, the second network device may further detect path quality of the path used to carry the service, for example, detect quality data such as a packet loss and a delay on the path between the first network device and the second network device. In a case, corresponding quality feedback data is carried in the response packet sent by the second network device to the first network device. The quality feedback data may include quality data fed back by the second network device and/or quality feedback data added by a plurality of intermediate devices to the response packet on a path on which the second network device sends the response packet to the first network device, so that the first network device determines a unidirectional or bidirectional path quality detection result. In another case, the second network device may alternatively directly determine a unidirectional path quality detection result based on the quality data obtained through detection.

In some possible implementations, if the first network device determines that the path for carrying the service is faulty or path quality does not meet a requirement, the method may further include: The first network device switches the path used to carry the service to a path from the first network device to a third network device, where the third network device carries the service after the switching. In this way, through service-level fault detection, a faulty path for carrying which service can be accurately detected, so that the path for carrying the service is switched, and switching forwarding paths of all services carried on a tunnel that is performed because of tunnel-level switching does not need to be performed. In this way, network resources are saved to a specific extent.

According to a second aspect, an embodiment of this application further provides a method for implementing service path detection. The method is applied to a second network device. For example, the method may include: The second network device receives a first packet sent by a first network device, where the first packet includes a first indication and identification information of a service, and the first indication indicates that the first packet is a detection packet; and the second network device may detect, based on the first indication and the identification information of the service, at least one of a path that is between the first network device and the second network device and that is used to carry the service and a path that is between the second network device and an access-side network device and that is used to carry the service. It can be learned that, according to the method, a sender network device adds the first indication and the identification information of the service to the sent detection packet, so that a receiver network device can accurately determine that the received packet is a detection packet and perceive the corresponding service, to perform, based on the detection packet, connectivity detection, quality detection, or the like on the path for carrying the service. This resolves problems that a coarse granularity cannot meet a requirement and network resources are wasted. The problems are caused because only tunnel-level detection between the network devices is supported in the current related technology. In this way, finer-grained and more accurate service-level detection is implemented, an accurate basis is provided for service-level switching, and normal running of a service in a network is ensured.

The identification information of the service may be carried in a first IPv6 header or a first IPv6 extension header of the first packet. The identification information of the service may be, for example, a VPN SID corresponding to the second network device.

The first indication may be carried in the first IPv6 header or the first IPv6 extension header of the first packet. The following describes, by using examples, various possible implementations in which the first packet carries the first indication.

In a possible implementation, the first packet may include the first IPv6 header, and the first indication is carried in a next header field in the first IPv6 header. This implementation is applicable to an SRv6 BE scenario. Alternatively, the first packet may include the first IPv6 extension header, and the first indication is carried in a next header field in a first SRH of the first IPv6 extension header. This implementation is applicable to an SRv6 policy scenario.

In this implementation, the first IPv6 extension header of the first packet may further include an alert label and a control word, the alert label and the control word indicate detection information in a payload of the first packet, and the detection information indicates the second network device to detect, based on the detection information, the path for carrying the service. That the alert label and the control word indicate the detection information may be determining, based on values of the alert label and the control word, that subsequently carried content is detection information, or determining, based on values of the alert label and the control word, that subsequently carried content is detection information and determining a type of the detection information. For example, based on an alert label 13 and the control word, it may be determined that the subsequently carried content is detection information and a type of the detection information is BFD information.

In another possible implementation, the first packet may include the first IPv6 header, and the first indication is carried in an args field in a first DA field in the first IPv6 header. This implementation is applicable to an SRv6 BE scenario. Alternatively, the first packet may include the first IPv6 extension header, and the first indication is carried in an args field in a first DA field in a first SRH of the first IPv6 extension header. This implementation is applicable to an SRv6 policy scenario.

In still another possible implementation, the first packet may include the first IPv6 extension header, and the first indication may be carried in a flags field in an SRH of the first IPv6 extension header.

In yet another possible implementation, the first packet may include the first IPv6 extension header, and the first indication may be carried in a TLV field in an HBH option header of the first IPv6 extension header, or carried in a TLV field in a DOH of the first IPv6 extension header.

In some possible implementations, the method may further include: The second network device receives a second packet sent by the first network device, where the second packet is a service packet used to carry the service, and the second packet does not include the first indication. In this way, after receiving the first packet and the second packet, the second network device can determine, based on an indication carried in the packet, whether the packet is a detection packet or a service packet, to perform corresponding processing based on a specific packet type, so that service-level detection is possible.

That the second packet does not include the first indication may mean that the second packet does not include a field used to carry the first indication, or may mean that the second packet includes a field used to carry the first indication, but a value of the field in the second packet is different from a value of the field in the first packet, and the values are respectively used to carry different indications. The value of the field in the first packet is used to carry the first indication, and the first indication indicates that the first packet is a detection packet. The value of the field in the second packet is used to carry a second indication, and the second indication indicates that the second packet is a service packet. In a case, assuming that the second packet includes a second IPv6 header, the second indication is carried in a next header field in the second IPv6 header, and the first indication is a first value of the next header field in the first IPv6 header, the second indication may be a second value (where the first value is not equal to the second value) of the next header field in the second IPv6 header. Alternatively, assuming that the second packet includes a second IPv6 extension header, the second indication is carried in a next header field in a second SRH of the second IPv6 extension header, and the first indication is a first value of the next header field in the first SRH of the first IPv6 extension header, the second indication may be a second value of the next header field in the second SRH. In another case, assuming that the second packet includes a second IPv6 header, the second indication is carried in an args field in a second DA field in the second IPv6 header, and the first indication is a third value of the args field in the first DA field in the first IPv6 header, the second indication may be a fourth value (where the third value is not equal to the fourth value) of the args field in the second DA field. Alternatively, assuming that the second packet includes a second IPv6 extension header, the second indication is carried in an args field in a second DA field in a second SRH of the second IPv6 extension header, and the first indication is a third value of the args field in the first DA field in the first SRH of the first IPv6 extension header, the second indication may be a fourth value of the args field in the second DA field in the second SRH. In still another case, assuming that the second packet includes a second IPv6 extension header, the second indication is carried in a flags field in an SRH of the second IPv6 extension header, and the first indication is a fifth value of the flags field in the SRH of the first IPv6 extension header, the second indication may be a sixth value (where the fifth value is not equal to the sixth value) of the flags field in the SRH of the second IPv6 extension header.

In a possible implementation, the second network device may detect, based on the received first packet, a path status of the path used to carry the service, where the path status may be, for example, a path fault status or a path quality status. In an example, assuming that the second network device receives the first packet, the second network device may detect, based on the first indication and the identification information of the service, the path that is between the second network device and the access-side network device and that is used to carry the service, or detect a path in an access-side network in a manner, for example, detect a link connected to a network device in the access-side network or an included interface. In this example, in a case, the second network device may choose not to respond to the first packet. In this case, the first network device does not receive, within preset duration, a response packet sent by the second network device, and may determine that the path for carrying the service is faulty. For example, the first network device determines that a path that is between the first network device and the access-side network device and that is used to carry the service is faulty. In another case, the second network device may choose to generate a response corresponding to the first packet and send the response to the first network device. In this case, when receiving a response packet sent by the second network device, the first network device may determine, based on link status information or interface status information carried in the response packet, whether the path for carrying the service is faulty. For example, the first network device may determine, based on the response packet, that the path that is between the second network device and the access-side network device and that is used to carry the service is faulty.

In another example, the second network device may further detect, based on the received first packet, path quality of the path used to carry the service, for example, detect quality data such as a packet loss and a delay on the path between the first network device and the second network device. In a case, the second network device may include corresponding quality feedback data in a response packet sent to the first network device, so that the first network device determines a bidirectional path quality detection result. In another case, the second network device may alternatively directly determine a unidirectional path quality detection result based on the quality data obtained through detection.

In some possible implementations, in the method, for example, that the second network device detects, based on the first indication and the identification information of the service, the path for carrying the service may include: If the second network device determines that the first packet is a detection packet, and determines that detection performed based on the first indication is locally supported, the second network device detects, according to a local detection policy, the path for carrying the service. According to the local fault detection policy, the first packet may be sent to a corresponding detection process, and fault detection is performed in the corresponding detection process. For example, assuming that the first packet is a BFD detection packet, when determining that the BFD detection packet is locally supported, the second network device sends service-related content and detection information in the BFD detection packet to a local BFD process, to perform corresponding fault detection by using the BFD process. That detection to be performed based on the first indication is locally supported may mean that a detection function indicated by the first indication is enabled through local configuration of the network device. It should be noted that, sending the first packet to the corresponding detection process may be, for example, sending, to the corresponding detection process, the remaining service-related content and detection information after tunnel information (such as the SRH in the first packet) in the first packet is removed.

In the method provided in the first aspect and the second aspect, the first network device may be an ingress PE device carrying the service, and the second network device may be an egress PE device carrying the service. Alternatively, the first network device may be another type of network device that can initiate, in a network, the detection method described in the first aspect and the second aspect, and the second network device may be another possible type of device that can respond to the received detection packet and perform corresponding path detection.

In the method provided in the first aspect and the second aspect, the service carried between the first network device and the second network device may be a layer 2 virtual private network (L2VPN) service. The L2VPN service may include, for example, a service carried by a conventional VPN technology or an Ethernet virtual private network (EVPN) technology. Both the conventional VPN service and the EVPN service may be deployed in the network by using a virtual leased line (VLL) service model or a virtual private local area network service (virtual private LAN service, VPLS) model.

In the method provided in the first aspect and the second aspect, the first packet may be a BFD packet, or may be an operation administration and maintenance (OAM) packet. Different service path detection functions can be implemented based on different types of the first packet, for example, service path fault detection or service path quality detection. Service path quality detection may be performed based on an indicator such as a delay, a packet loss, or a jitter.

When the first packet is a BFD packet, according to the foregoing method, not only connectivity detection on the path that is between the first network device and the second network device and that is for carrying the service can be implemented, but also connectivity detection on the path that is between the second network device and the access-side network device and that is for carrying the service can be implemented. In this way, the first network device can learn of not only connectivity of the tunnel path between the first network device and the second network device, but also connectivity of the path that is from the first network device to the access-side network device and that is used to carry the service, to achieve an effect of service-level connectivity detection.

When the first packet is an OAM packet, the path status detected according to the foregoing method may include path connectivity and path quality. In a possible case, that the OAM packet implements path quality detection may include: The first network device sends the OAM packet to the second network device, to notify statistical information (for example, a quantity of sent data packets and a timestamp) of data that has been sent by the first network device. The second network device may determine a to-be-detected service based on the identification information of the service carried in the OAM packet, obtain a received statistical result corresponding to the received data for the to-be-detected service, and obtain, by processing the statistical information, a path quality detection result corresponding to a path for carrying the to-be-detected service. Optionally, the second network device may further generate an OAM packet carrying the detection result and send the packet to the first network device, to notify the first network device of path quality of the to-be-detected service. Alternatively, in another possible case, that the OAM packet implements path quality detection may include: The first network device sends the OAM packet to the second network device, to notify statistical information of data sent by the first network device. The second network device may determine a to-be-detected service based on the identification information of the service carried in the OAM packet, obtain a statistical result corresponding to received data of the to-be-detected service, include the statistical result in a generated OAM packet, and send the packet to the first network device, to indicate the first network device to process the statistical result in the received OAM packet and obtain a detection result of a path for carrying the to-be-detected service, and further determine quality of the path for carrying the to-be-detected service. In addition, the OAM packet is used as a detection packet. In one aspect, the path quality of the path that is between the first network device and the second network device and that is for carrying the service can be detected, and in another aspect, connectivity of the path for carrying the service can be detected.

According to a third aspect, an embodiment of this application further provides an apparatus for implementing service path detection. The apparatus is applied to a first network device, and the apparatus is applied to a network supporting SRv6. The apparatus may include a generation unit and a sending unit. The generation unit is configured to generate a first packet based on the internet protocol version 6 IPv6, where the first packet includes a first indication and identification information of a service, and the first indication indicates that the first packet is a detection packet. The sending unit is configured to send the first packet to a second network device, to indicate the second network device that receives the first packet to detect, based on the first indication and the identification information of the service, at least one of a path that is between the first network device and the second network device and that is for carrying the service and a path that is between the second network device and an access-side network device and that is for carrying the service.

The identification information of the service may be carried in a first IPv6 header or a first IPv6 extension header of the first packet.

The first indication may be carried in the first IPv6 header or the first IPv6 extension header of the first packet.

In an example, the first packet includes the first IPv6 header, and the first indication is carried in a next header next header field in the first IPv6 header; or the first packet includes the first IPv6 extension header, and the first indication is carried in a next header field in a first segment routing header SRH of the first IPv6 extension header. The first IPv6 extension header of the first packet further includes an alert label and a control word, the alert label and the control word indicate detection information in a payload of the first packet, and the detection information indicates the second network device to detect, based on the detection information, the path for carrying the service.

In another example, the first packet includes the first IPv6 header, and the first indication is carried in an arguments args field in a first destination address DA field in the first IPv6 header; or the first packet includes the first IPv6 extension header, and the first indication is carried in an args field in a first DA field in a first SRH of the first IPv6 extension header.

In still another example, the first packet includes the first IPv6 extension header, and the first indication is carried in a flags field in an SRH of the first IPv6 extension header.

In yet another example, the first packet includes the first IPv6 extension header, and the first indication is carried in a type-length-value TLV field in a hop-by-hop HBH option header of the first IPv6 extension header, or carried in a TLV field in a destination option header DOH of the first IPv6 extension header.

In some possible implementations, the sending unit is further configured to send a second packet to the second network device, where the second packet is a service packet used to carry the service, and the second packet does not include the first indication. The second packet may further include a second indication, the second indication indicates that the second packet is a service packet, and the second indication is different from the first indication.

The second indication being different from the first indication may include: The second packet includes a second IPv6 header, the second indication is carried in a next header field in the second IPv6 header, the first indication is a first value of the next header field in the first IPv6 header, and the second indication is a second value of the next header field in the second IPv6 header; the second packet includes a second IPv6 extension header, the second indication is carried in a next header field in a second SRH of the second IPv6 extension header, the first indication is a first value of the next header field in the first SRH of the first IPv6 extension header, and the second indication is a second value of the next header field in the second SRH; the second packet includes a second IPv6 header, the second indication is carried in an args field in a second DA field in the second IPv6 header, the first indication is a third value of the args field in the first DA field in the first IPv6 header, and the second indication is a fourth value of the args field in the second DA field; the second packet includes a second IPv6 extension header, the second indication is carried in an args field in a second DA field in a second SRH of the second IPv6 extension header, the first indication is a third value of the args field in the first DA field in the first SRH of the first IPv6 extension header, and the second indication is a fourth value of the args field in the second DA field in the second SRH; or the second packet includes a second IPv6 extension header, the second indication is carried in a flags field in an SRH of the second IPv6 extension header, the first indication is a fifth value of the flags field in the SRH of the first IPv6 extension header, and the second indication is a sixth value of the flags field in the SRH of the second IPv6 extension header.

In some possible implementations, the apparatus may further include a determining unit. The determining unit is configured to: if a response packet of the second network device for the first packet is not received within preset duration, determine that a path that is between the first network device and the access-side network device and that is used to carry the service is faulty.

In some possible implementations, the apparatus may further include a receiving unit and a determining unit. The receiving unit is configured to receive a response packet of the second network device for the first packet; and the determining unit is configured to determine, based on the response packet, a path status of the path that is between the second network device and the access-side network device and that is used to carry the service.

In some possible implementations, the apparatus may further include a switching unit. The switching unit is configured to: when determining, based on a fact that the response packet of the second network device for the first packet is not received within the preset duration, that the path used to carry the service is faulty, or determining, based on the path status, that the path used to carry the service is faulty or does not meet a path quality requirement, switch the path used to carry the service to a path from the first network device to a third network device, where the third network device carries the service after the switching.

The apparatus for implementing service path detection provided in the third aspect is configured to perform the related operations mentioned in the first aspect. For specific implementations and effects of the apparatus, refer to the related descriptions in the first aspect. Details are not described herein again.

According to a fourth aspect, an embodiment of this application further provides an apparatus for implementing service path detection. The apparatus is applied to a second network device, and the apparatus is applied to a network supporting SRv6. The apparatus may include a receiving unit and a detection unit. The receiving unit is configured to receive a first packet sent by a first network device, where the first packet includes a first indication and identification information of a service, and the first indication indicates that the first packet is a detection packet. The detection unit is configured to detect, based on the first indication and the identification information of the service, at least one of a path that is between the first network device and the second network device and that is for carrying the service and a path that is between the second network device and an access-side network device and that is for carrying the service.

The identification information of the service may be carried in a first IPv6 header or a first IPv6 extension header of the first packet.

The first indication may be carried in the first IPv6 header or the first IPv6 extension header of the first packet.

In an example, the first packet includes the first IPv6 header, and the first indication is carried in a next header next header field in the first IPv6 header; or the first packet includes the first IPv6 extension header, and the first indication is carried in a next header field in a first segment routing header SRH of the first IPv6 extension header. The first IPv6 extension header of the first packet further includes an alert label and a control word, the alert label and the control word indicate detection information in a payload of the first packet, and the detection information indicates the second network device to detect, based on the detection information, the path for carrying the service.

In another example, the first packet includes the first IPv6 header, and the first indication is carried in an arguments args field in a first destination address DA field in the first IPv6 header; or the first packet includes the first IPv6 extension header, and the first indication is carried in an args field in a first DA field in a first SRH of the first IPv6 extension header.

In still another example, the first packet includes the first IPv6 extension header, and the first indication is carried in a flags field in an SRH of the first IPv6 extension header.

In yet another example, the first packet includes the first IPv6 extension header, and the first indication is carried in a type-length-value TLV field in a hop-by-hop HBH option header of the first IPv6 extension header, or carried in a TLV field in a destination option header DOH of the first IPv6 extension header.

In some possible implementations, the receiving unit is further configured to receive a second packet sent by the first network device, where the second packet is a service packet used to carry the service, and the second packet does not include the first indication. The second packet may further include a second indication, the second indication indicates that the second packet is a service packet, and the second indication is different from the first indication.

The second indication being different from the first indication may include: The second packet includes a second IPv6 header, the second indication is carried in a next header field in the second IPv6 header, the first indication is a first value of the next header field in the first IPv6 header, and the second indication is a second value of the next header field in the second IPv6 header; the second packet includes a second IPv6 extension header, the second indication is carried in a next header field in a second SRH of the second IPv6 extension header, the first indication is a first value of the next header field in the first SRH of the first IPv6 extension header, and the second indication is a second value of the next header field in the second SRH; the second packet includes a second IPv6 header, the second indication is carried in an args field in a second DA field in the second IPv6 header, the first indication is a third value of the args field in the first DA field in the first IPv6 header, and the second indication is a fourth value of the args field in the second DA field; the second packet includes a second IPv6 extension header, the second indication is carried in an args field in a second DA field in a second SRH of the second IPv6 extension header, the first indication is a third value of the args field in the first DA field in the first SRH of the first IPv6 extension header, and the second indication is a fourth value of the args field in the second DA field in the second SRH; or the second packet includes a second IPv6 extension header, the second indication is carried in a flags field in an SRH of the second IPv6 extension header, the first indication is a fifth value of the flags field in the SRH of the first IPv6 extension header, and the second indication is a sixth value of the flags field in the SRH of the second IPv6 extension header.

In some possible implementations, the apparatus may further include a sending unit. The sending unit is configured to send a response packet to the first network device, so that the first network device determines, based on the response packet, that the path that is between the second network device and the access-side network device and that is for carrying the service is faulty. The response packet sent by the second network device may include interface status information of the second network device, and the interface status information indicates the first network device to determine that the path that is between the second network device and the access-side network device and that is for carrying the service is faulty.

In some possible implementations, the detection unit may be specifically configured to: if it is determined that the first packet is a detection packet, and it is determined that detection to be performed based on the first indication is locally supported, detect, according to a local detection policy, the path for carrying the service.

The apparatus for implementing service path detection provided in the fourth aspect is configured to perform the related operations mentioned in the second aspect. For specific implementations and effects of the apparatus, refer to the related descriptions in the second aspect. Details are not described herein again.

In the apparatuses provided in the third aspect and the fourth aspect, the apparatus for implementing service path detection and that is applied to the first network device may be an ingress PE device carrying the service, and the apparatus for implementing service path detection and that is applied to the second network device may be an egress PE device carrying the service.

In the apparatuses provided in the third aspect and the fourth aspect, a service carried between apparatuses for implementing service path detection may be an L2VPN service. The L2VPN service may include, for example, a service carried in a conventional VPN technology or an EVPN technology. Both the conventional VPN service and the EVPN service may be deployed in a network by using a VLL service model or a VPLS service model.

In the apparatuses provided in the third aspect and the fourth aspect, the first packet may be a BFD packet, or may be an OAM packet.

According to a fifth aspect, this application further provides a network device. The network device includes a processor, configured to enable the network device to implement the method provided in the first aspect or the second aspect. The network device may further include a memory. The memory is coupled to the processor. When the processor executes instructions stored in the memory, the network device is enabled to implement the method provided in the first aspect or the second aspect. The network device may further include a communication interface. The communication interface is used by the network device to communicate with another device. For example, the communication interface may be a transceiver, a circuit, a bus, a module, or another type of communication interface. In this application, the instructions in the memory may be pre-stored, or may be downloaded from the internet and stored when the network device is used. A source of the instructions in the memory is not specifically limited in this application.

According to a sixth aspect, this application further provides a network system, where the network system includes a first network device and a second network device. The first network device is configured to perform the method provided in the first aspect, and the second network device is configured to perform the method provided in the second aspect.

According to a seventh aspect, this application provides a chip, including a processor and an interface circuit. The interface circuit is configured to: receive instructions and transmit the instructions to the processor, and the processor is configured to execute instructions corresponding to the method provided in the first aspect or the second aspect.

According to an eighth aspect, this application provides a computer-readable storage medium. The computer-readable storage medium stores program code or instructions. When the program code or the instructions are run on a computer, the computer is enabled to perform the method provided in the first aspect or the second aspect.

According to a ninth aspect, this application provides a computer program product, including a computer program. When the computer program is executed by a processor, the method provided in the first aspect or the second aspect is implemented.

DETAILED DESCRIPTION OF ILLUSTRATIVE EMBODIMENTS

Figure 1:
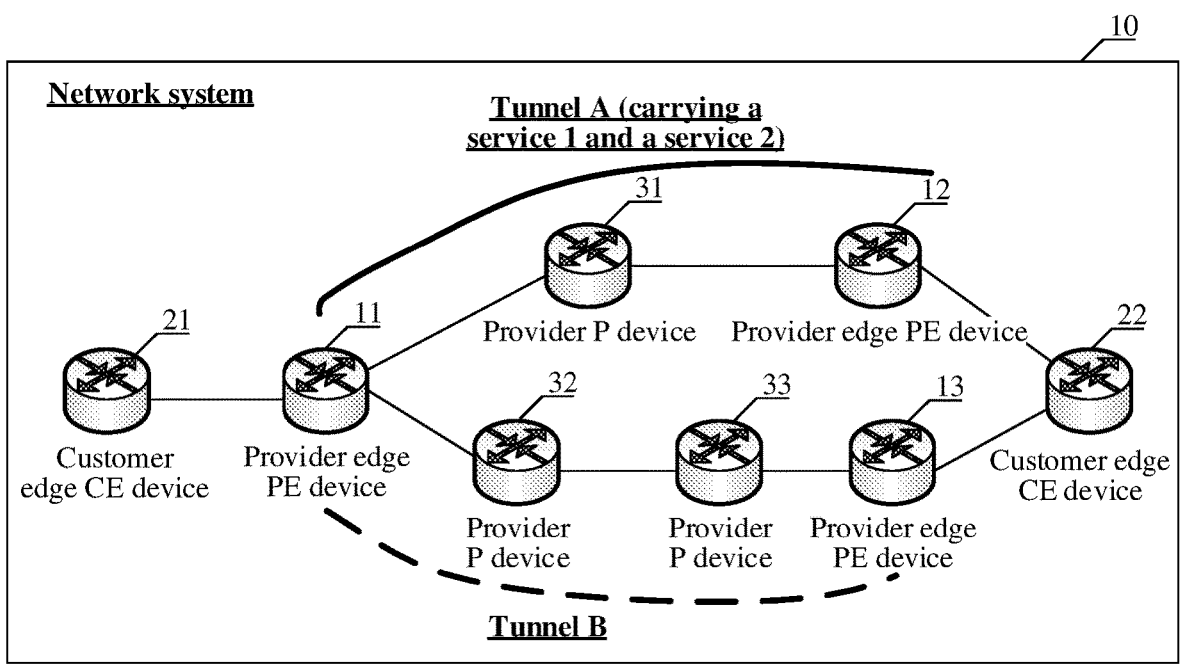
FIG. 1 is a schematic diagram of a structure of a network system 10 according to an embodiment of this application.

Currently, in an SRv6 network, only tunnel-level fault detection can be performed, and therefore, tunnel-level switching can be performed only when a fault is detected in a tunnel. For example, a network system 10 shown in FIG. 1 may include a PE device 11, a PE device 12, a PE device 13, a customer edge (CE) device 21, a CE device 22, a provider (P) device 31, a P device 32, and a P device 33. The PE device 11 is connected to the CE device 21, the PE device 11 is connected to the PE device 12 via the P device 31, the PE device 11 is connected to the PE device 13 via the P device 32 and the P device 33, and the PE device 12 and the PE device 13 are connected to the CE device 22. It is assumed that there is a tunnel 1 between the PE device 11 and the PE device 12, there is a tunnel 2 between the PE device 11 and the PE device 13, and the tunnel 1 carries a service 1 and a service 2. The PE device 11 can detect, by using a tunnel detection packet, that a fault occurs in the tunnel 1, and switch both the service 1 and the service 2 that are carried on the tunnel 1 onto the tunnel 2. In other words, after the switching, both traffic of the service 1 and traffic of the service 2 are sent to the CE device 22 by the PE device 13.

However, a granularity of tunnel-level fault detection is excessively coarse. Once the fault is caused by a service, and another service carried on the tunnel can run normally, this fault detection manner cannot accurately detect a service in a path on which a fault occurs, cannot accurately switch the service forwarding path on which the fault occurs, and can only perform tunnel-level path switching. As a result, a customer PE device performs path switching on all services carried on the tunnel, in other words, a path for carrying a service normally running on the tunnel is also switched. Consequently, network resources are wasted. In addition, in another path detection scenario, service-level detection also needs to be performed on path quality, to know path quality of a path for carrying a service, and further provide a better service.

Based on this, embodiments of this application provide a method for implementing service path detection. A first network device can generate, based on the internet protocol version 6 (IPv6), a first packet including a first indication and identification information of a service, and send the first packet to a second network device. The first indication indicates that the first packet is a detection packet, and the identification information of the service indicates the service. In this way, the second network device that receives the first packet may determine, based on the first indication in the first packet, that the first packet is a detection packet, and determine, based on the identification information of the service in the first packet, to detect a path for carrying the service, for example, detect a fault and/or quality of the path for carrying the service. It can be learned that, according to the method provided in embodiments of this application, a sender network device adds the indication and the identification information of the service to the sent detection packet, so that a receiver network device can accurately determine that the received packet is a detection packet and perceive the corresponding service, to detect, based on the detection packet, the path for carrying the service. This resolves problems that a coarse granularity cannot meet a requirement and network resources are wasted. The problems are caused because only tunnel-level detection between the network devices can be implemented currently. In this way, a requirement for performing service-level detection on path quality is also met, finer-grained and more accurate service-level path detection is implemented, an accurate basis is provided for service-level path switching, and normal running of a service in a network is ensured.

The network system 10 shown in FIG. 1 is still used as an example. A path detection process provided in embodiments of this application may include, for example, the following steps. S11: The PE device 11 generates a packet 41 based on IPv6, where the packet 41 includes an indication 51 and identification information of the service 1, the indication 51 indicates that the packet 41 is a detection packet, and the identification information of the service 1 may be used to identify the service 1. In this case, the packet 41 indicates a receiver device to detect a path for carrying the service 1. S12: The PE device 11 sends the packet 41 to the PE device 12 via the P device 31. S13: After receiving the packet 41, the PE device 12 may determine, based on the indication 51, that the received packet is a detection packet, and detect, based on the identification information of the service 1 in the packet 41, the path for carrying the service 1. In a case, the following S14a and S15a may be performed, and in another case, the following S14b and S15b may be performed. S14a: If the PE device 12 determines that the path for carrying the service 1 is faulty, the PE device 12 does not respond to the packet 41. S15a: If the PE device 11 does not receive a response packet for the packet 41 within preset duration (for example, 1 second), the PE device 11 determines that a path that is between the PE device 11 and the CE device 22 and that is for carrying the service 1 is faulty. S14b: The PE device 12 determines a status of the path for carrying the service 1, and sends a response packet for the packet 41 to the PE device 11, where the response packet may include the determined status of the path for carrying the service 1. The path status may include path quality and/or path connectivity of a path that is between the PE device 12 and an access-side network device (for example, the CE device 22) and that is for carrying the service 1. The path status may further include path quality and/or path connectivity of a path that is between the PE device 11 and the PE device 12 and that is for carrying the service 1. S15b: The PE device 11 determines, based on the response packet, the path status of the path that is between the PE device 11 and the CE device 22 and that is for carrying the service 1. Then, the following S16 may be further performed. To be specific, when determining, based on S15a, that the path that is between the PE device 11 and the CE device 22 and that is for carrying the service 1 is faulty, or when determining, based on S15b, that the path status indicates that the path that is between the PE device 11 and the CE device 22 and that is for carrying the service 1 is faulty or the path that is between the PE device 11 and the CE device 22 and that is for carrying the service 1 does not meet a path quality requirement, the PE device 11 switches the service 1 onto a path including the PE device 13. After the switching, the service 1 is carried by the PE device 13, and the service 2 is still carried by the PE device 12. In this way, more refined path detection and switching are implemented, and resource utilization is more reasonable.

In a case, if the path that is between the PE device 11 and the PE device 12 and that is for carrying the service is reachable, and the PE device 12 can receive a detection packet sent by the PE device 11, the PE device 12 may include, in the response packet, the obtained path status of the path for carrying the service 1, and send the response packet to the PE device 11. The path status carried in the response packet may include related information of the quality or the connectivity, obtained by the PE device 12, of the path between the PE device 12 and the access-side network device (for example, the CE device 22). In this way, the PE device 11 may perceive, based on the response packet, whether a path range that is from the PE device 12 to the access-side network device and that is for carrying the service 1 is faulty or whether the path quality meets the requirement. In another case, when a link or a device between the PE device 11 and the PE device 12 is faulty, and the PE device 12 is faulty, the PE device 12 may not receive the packet 41. Therefore, the PE device 11 does not receive, within preset duration, the response packet sent by the PE device 12, and may determine that the path that is between the PE device 11 and the CE device 22 and that is for carrying the service 1 is faulty. In another case, when determining that the path that is between the PE device 11 and the PE device 12 and that is for carrying the service 1 is faulty, the PE device 12 may alternatively actively send a packet to the PE device 11 by using a backup path, to notify the PE device 11 that the path for carrying the service 1 is faulty, notify the PE device 11 that the quality of the path for carrying the service 1 does not meet the requirement, or notify the PE device 11 of a status of a related interface, device, or link on the path for carrying the service 1, so that the PE device 11 determines, based on status information received from the PE device 12, whether the path for carrying the service is faulty or does not meet the path quality requirement.

In the network system 10 shown in FIG. 1, the PE devices may be directly connected. The PE devices may alternatively be indirectly connected via one or more forwarding devices, where the forwarding device includes but is not limited to the P device.

It should be noted that the network device in embodiments of this application may be a device, for example, a router, a switch, a forwarder, or a firewall, that can carry the service.

It should be noted that the method provided in each embodiment of this application may be applied to the SRv6 network or another required application scenario, for example, another derivative network that supports running of the IPv6 protocol.

It should be noted that the service mentioned in each embodiment of this application may be a layer 2 virtual private network (L2VPN) service. The L2VPN service may include, for example, a service carried by a conventional VPN technology or an Ethernet virtual private network (EVPN) technology. In the L2VPN service, both the conventional VPN service and the EVPN service may be deployed in a network by using a virtual leased line (VLL) service model or a virtual private local area network service (virtual private LAN service, VPLS) model. A VLL is used to support a point-to-point service, and a VPLS is used to support a point-to-multipoint service or a multipoint-tomultipoint service. The network system 10 shown in FIG. 1 is used as an example. If the network system 10 shown in FIG. 1 is a conventional VPN network, regardless of the VLL service model or the VPLS service model, a connection between the PE device 11 and the PE device 12 and a connection between the PE device 11 and the PE device 13 may each be referred to as a pseudo wire (PW). If the network system 10 shown in FIG. 1 is an EVPN network, for the VLL service model, a connection between the PE device 11 and the PE device 12 and a connection between the PE device 11 and the PE device 13 may each be referred to as a virtual private wire service (VPWS) neighbor. A conventional VPN network and an EVPN network may carry a same service type. The EVPN network can be implemented by using the border gateway protocol (BGP), and the conventional VPN network can be implemented by using at least one of a plurality of protocols such as the label distribution protocol (LDP) and BGP.

It should be noted that the detection packet mentioned in each embodiment of this application may be used to detect the connectivity of the path for carrying the service or the quality (for example, indicators such as a delay and a packet loss on the path) of the path for carrying the service. The detection packet may be, for example, a bidirectional forwarding detection (BFD) packet or an operation administration and maintenance (OAM) packet. When the detection packet is a BFD packet, the method provided in embodiments of this application may support, for example, static BFD detection, dynamic BFD detection, or seamless bidirectional forwarding detection (SBFD). The detected status of the path for carrying the service may refer to the connectivity or the quality of the path. When the detection packet is an OAM packet, the method provided in embodiments of this application may support, for example, connectivity fault management (CFM) detection or Y.1731 detection. A specific type of the detection packet and a supported detection type do not affect implementation of embodiments of this application.

For ease of understanding of the network fault detection method provided in embodiments of this application, the following describes the method with reference to the accompanying drawings.

Figure 2:
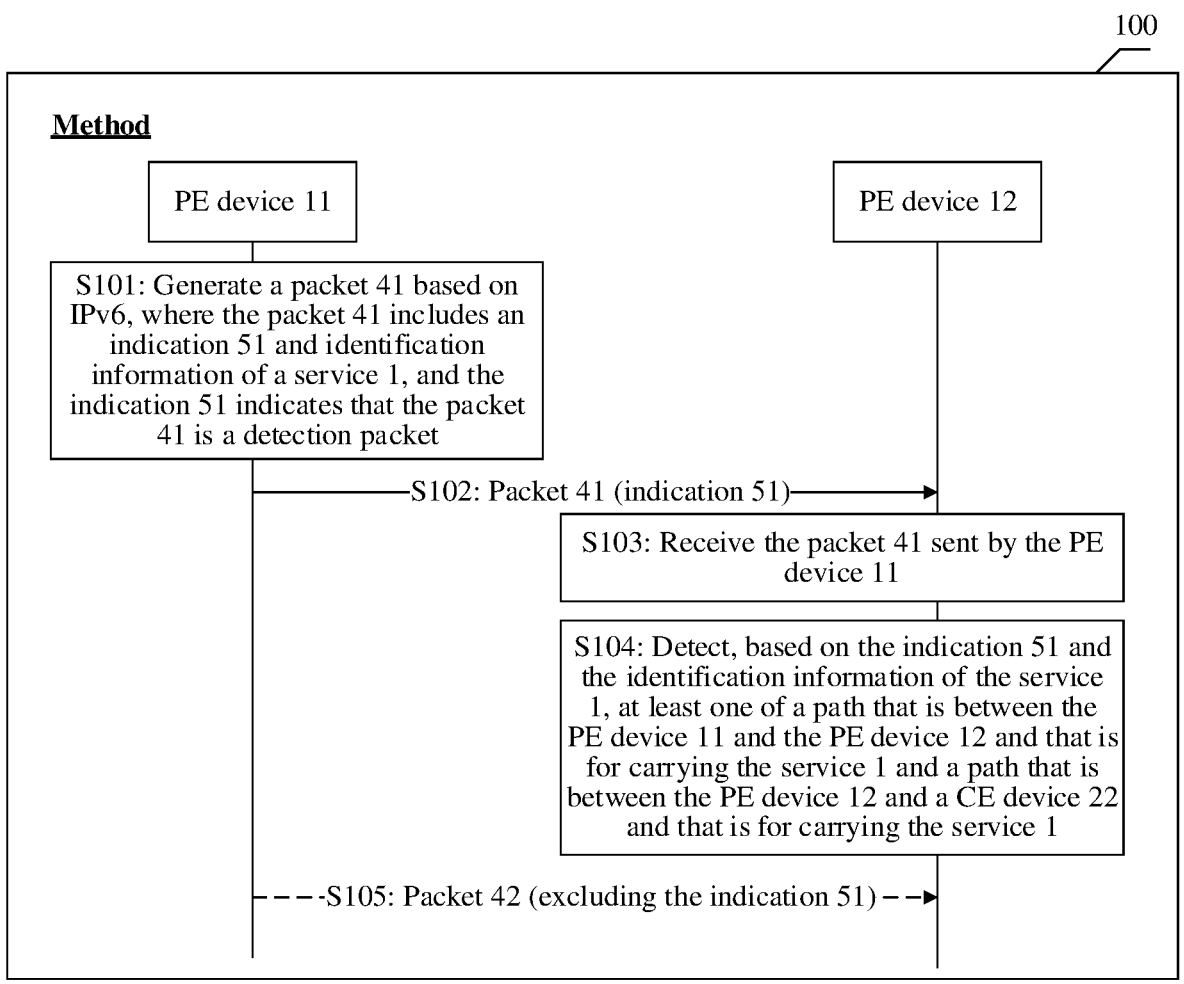
FIG. 2 is a flowchart of a method boo for implementing service path detection according to an embodiment of this application.

FIG. 2 is a schematic flowchart of a method 100 for implementing service path detection according to an embodiment of this application. The method 100 may be applied to a network scenario including a first network device and a second network device. In an example, the first network device may be a tunnel ingress PE device carrying a to-be-detected target service, and the second network device may be a tunnel egress PE device carrying the target service. For ease of understanding, a structure of the network system 10 shown in FIG. 1 is used as an example. Interaction between the PE device 11 and the PE device 12 is used for description. The to-be-detected target service is the service 1 carried on the PE device 11 and the PE device 12. During specific implementation, the method 100 may include, for example, the following S101 to S104.

S101: The PE device 11 generates a packet 41 based on IPv6, where the packet 41 includes an indication 51 and identification information of the service 1, and the indication 51 indicates that the packet 41 is a detection packet.

During specific implementation, in an SRv6 network, the PE device 11 may encapsulate a detection packet based on IPv6, to obtain the packet 41. The packet 41 may also be referred to as a detection packet encapsulated based on IPv6. For example, assuming that the detection packet is a BFD packet, the packet 41 in S101 may be referred to as a BFD packet encapsulated based on IPv6, and a BFD packet before encapsulation corresponds to detection information in the packet 41 obtained through encapsulation.

The identification information of the service 1 may be carried in an IPv6 header 1 of the packet 41, or may be carried in an IPv6 extension header 1', and is used to identify the service 1. For example, the identification information of the service 1 may be a VPN SID allocated by the PE device 12 to identify the service.

The indication 51 may be carried in the IPv6 header 1 of the packet 41, or the indication 51 may be carried in the IPv6 extension header 1'. The following describes, by using examples, locations of the indication 51 carried in the packet 41 in various cases.

Figure 3A:
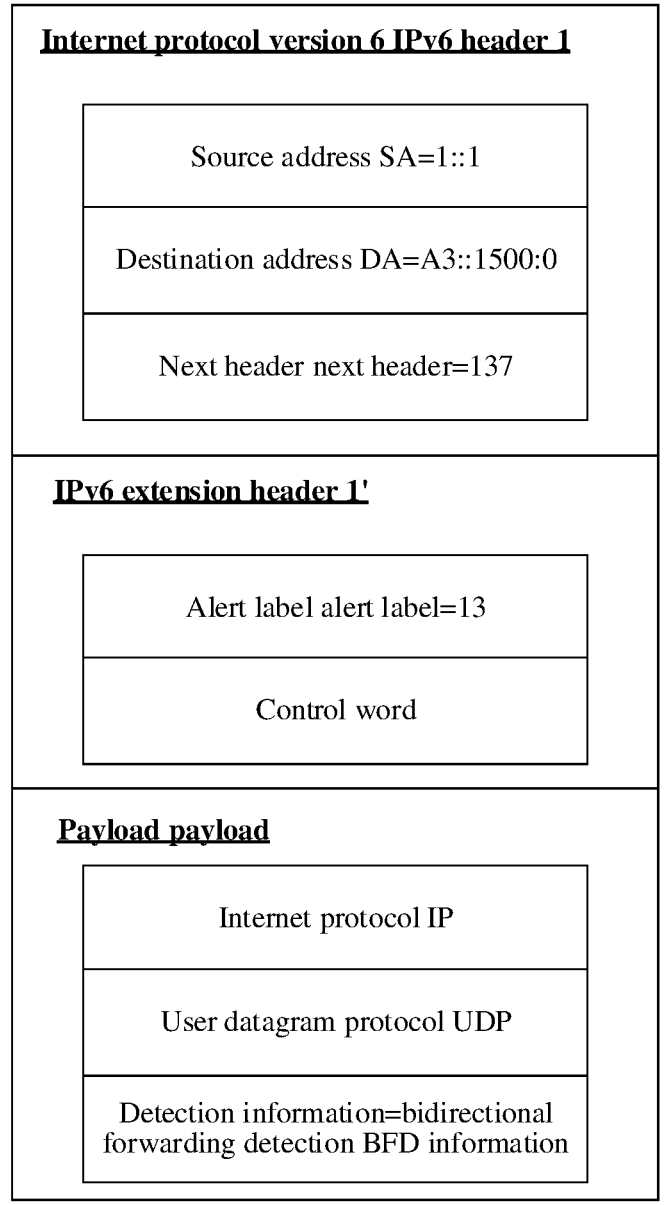
FIG. 3a is a schematic diagram of a format of a packet 1 according to an embodiment of this application.

In an example, for an SRv6 best effort (BE) scenario, the indication 51 may be carried in a next header field in the IPv6 header 1. For example, if the next header field in the IPv6 header 1 in the packet 41 is equal to 137, it indicates that the packet 41 is a detection packet. In this example, the packet 41 may further include the IPv6 extension header 1'. The IPv6 extension header 1' may include an alert label and a control word. The alert label and the control word indicate that a payload of the packet 41 carries detection information. The detection information indicates the PE device 12 to perform, based on the detection information, fault detection or quality detection on a path for carrying the service 1. That the alert label and the control word indicate the detection information may be determining, based on values of the alert label and the control word, that subsequently carried content is detection information, or determining, based on values of the alert label and the control word, that subsequently carried content is detection information and determining a type of the detection information. For example, based on an alert label 13 and the control word, it may be determined that the subsequently carried content is detection information and a type of the detection information is BFD information. In addition, the indication 51 may alternatively be considered to be carried in the next header field in the IPv6 header 1 and the alert label and the control word that are in the IPv6 extension header 1'. The next header field in the IPv6 header 1, the alert label in the IPv6 extension header 1', and the control word in the IPv6 extension header 1' jointly indicate that the packet 41 is a detection packet. A schematic diagram of a format of the packet 41 is shown in FIG. 3a. The packet 41 may include an IPv6 header 1 and an IPv6 extension header 1'. The IPv6 header 1 may include a source address (SA) field, a destination address (DA) field, and a next header field. A value of the SA field is an address of the PE device 11, for example, is equal to a loopback address 1::1 of the PE device 11. A value of the DA field is a VPN segment identifier (SID) of the PE device 12, for example, is equal to End.DX2 A3::1500:0 of the PE device 12. A value of the next header field may be 137. The IPv6 extension header 1' may include an alert label and a control word. A payload of the packet 41 may include the internet protocol (IP), the user datagram protocol (UDP), and detection information. When the alert label is equal to 13, the detection information is BFD information.

Figure 3B:
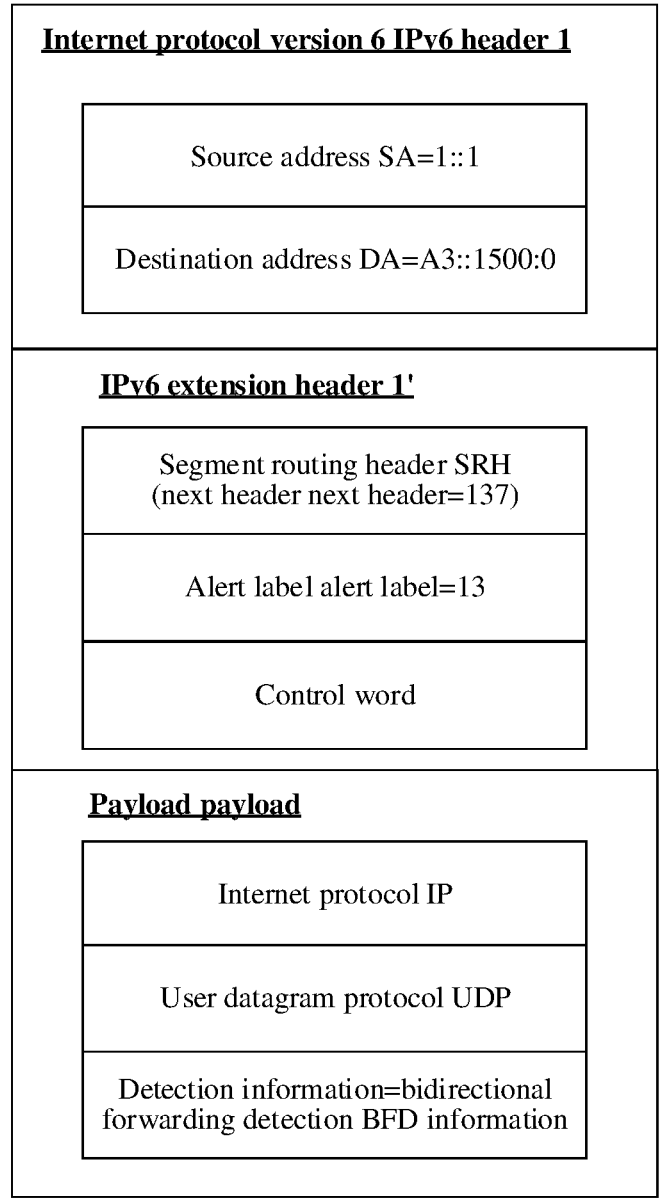
FIG. 3b is a schematic diagram of a format of another packet 1 according to an embodiment of this application.

In another example, for an SRv6 policy scenario, the indication 51 may be carried in a next header field in a segment routing header (SRH) of the IPv6 extension header 1. For example, if the next header field in the IPv6 extension header 1' in the packet 41 is equal to 137, it indicates that the packet 41 is a detection packet. In this example, the IPv6 extension header 1' may further include an alert label, a control word, and detection information. The alert label and the control word indicate detection information in a payload of the packet 41. The detection information indicates the PE device 12 to perform, based on the detection information, fault detection on a path for carrying the service 1. In addition, the indication 51 may alternatively be considered to be carried in the next header field in the SRH of the IPv6 extension header 1', the alert label, and the control word, and the three jointly indicate that the packet 41 is a detection packet. A schematic diagram of a format of the packet 41 is shown in FIG. 3*b*. The packet 41 may include an IPv6 header 1 and an IPv6 extension header 1'. The IPv6 header 1 may include an SA field and a DA field. The IPv6 extension header 1' may include a next header field, an alert label, and a control word. A payload of the packet 41 may include IP, UDP, and detection information. If the next header field is equal to 137, and the alert label is equal to 13, it indicates that the detection information is BFD information.

Figure 4A:
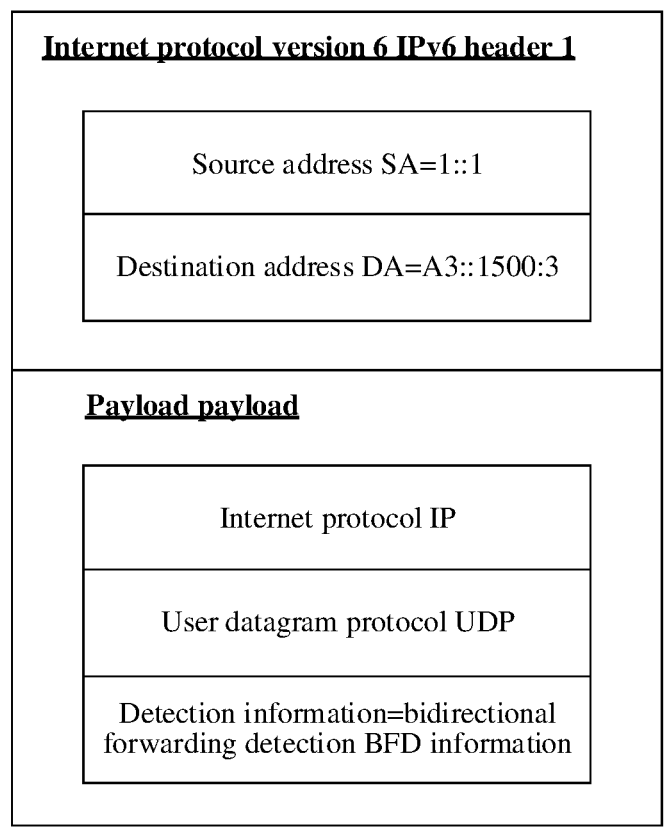
FIG. 4a is a schematic diagram of a format of a packet 1 according to an embodiment of this application.

In still another example, for an SRv6 BE scenario, the indication 51 may be carried in a DA field in the IPv6 header 1, for example, may be carried in an arguments (args) field in the DA field in the IPv6 header 1. For example, if the args field in the DA field in the IPv6 header 1 in the packet 41 is equal to 3, it indicates that the packet 41 is a detection packet. In this example, a payload of the packet 41 may include detection information. A schematic diagram of a format of the packet 41 is shown in FIG. 4*a*. The packet 41 may include an IPv6 header 1 and a payload. The IPv6 header 1 may include an SA field and a DA field. A value of the SA field is an address of the PE device 11, for example, is equal to a loopback address 1::1 of the PE device 11. A value of the DA field is a VPN SID of the PE device 12, for example, is End.DX2 A3::1500:3 (in other words, an args field in the DA field is equal to 3). The payload includes detection information, where the detection information may be BFD information. In another possible manner, an args field in the VPN SID may alternatively be set to another value, for example, another non-zero positive integer.

Figure 4B:
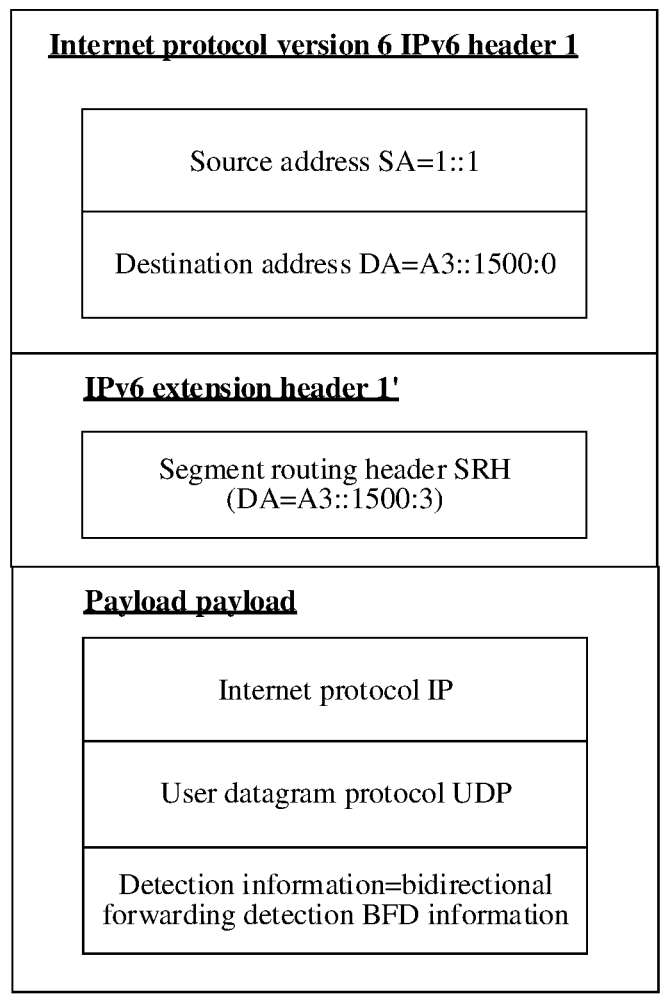
FIG. 4b is a schematic diagram of a format of another packet 1 according to an embodiment of this application.

In another example, for an SRv6 policy scenario, the indication 51 may be carried in a DA field in an SRH of the IPv6 extension header 1', for example, may be carried in an args field in the DA field in the IPv6 extension header 1'. For example, if the args field in the DA field in the IPv6 extension header 1' in the packet 41 is equal to 3, it indicates that the packet 41 is a detection packet. In this example, a payload of the packet 41 may include detection information. A schematic diagram of a format of the packet 41 is shown in FIG. 4*b*. The packet 41 may include an IPv6 header 1, an IPv6 extension header 1', and a payload. The IPv6 header 1 may include an SA field and a DA field. A value of the SA field is an address of the PE device 11, for example, is equal to a loopback address 1::1 of the PE device 11. A value of the DA field is a VPN SID of the PE device 12, for example, is equal to End.DX2 A3::1500:3 of the PE device 12. The IPv6 extension header 1' may include an SRH. The payload may include IP, UDP, and detection information. If an args field in the DA field in the SRH is equal to 3, the detection information may be BFD information.

Figure 5A:
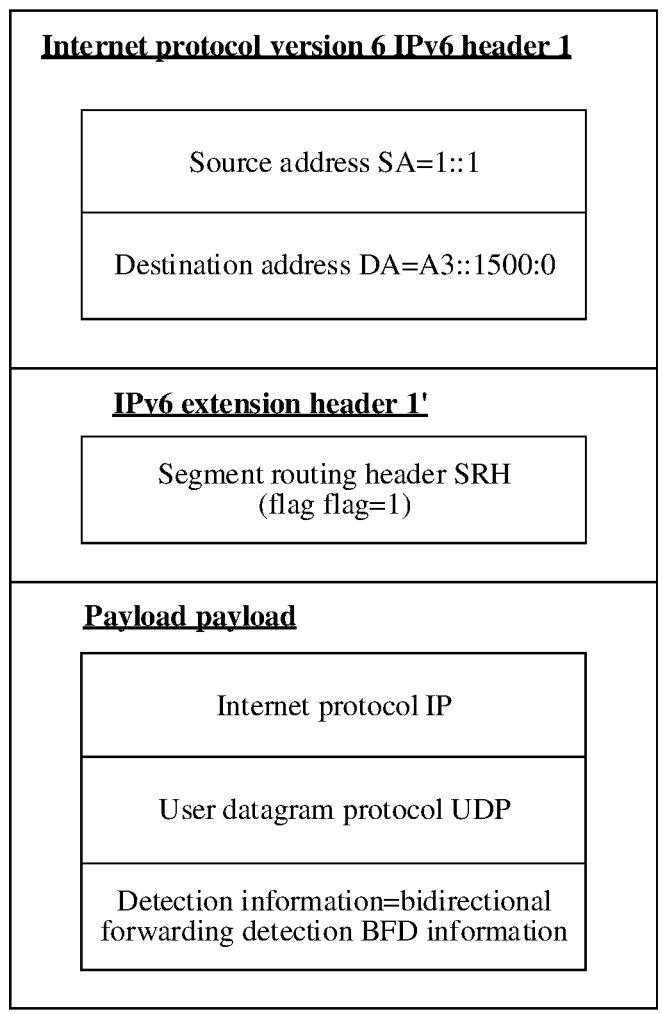
FIG. 5a is a schematic diagram of a format of a packet 1 according to an embodiment of this application.

In yet another example, the indication 51 may be carried in a flags (flags) field in an SRH of the IPv6 extension header 1'. For example, if a flag in the SRH of the IPv6 extension header 1' in the packet 41 is equal to 1, it indicates that the packet 41 is a detection packet. A flag for carrying the indication 51 may be any bit in an undefined flags field, or may be represented by reusing an occupied O-flag flag bit in flags. In this example, a payload of the packet 41 may include detection information. A schematic diagram of a format of the packet 41 is shown in FIG. 5*a*. The packet 41 may include an IPv6 header 1, an IPv6 extension header 1', and a payload. The IPv6 header 1 may include an SA field and a DA field. The IPv6 extension header 1' may include an SRH. The payload may include IP, UDP, and detection information. A value of a bit in flags in the SRH may be 1, and the detection information may be BFD information.

Figure 6A:
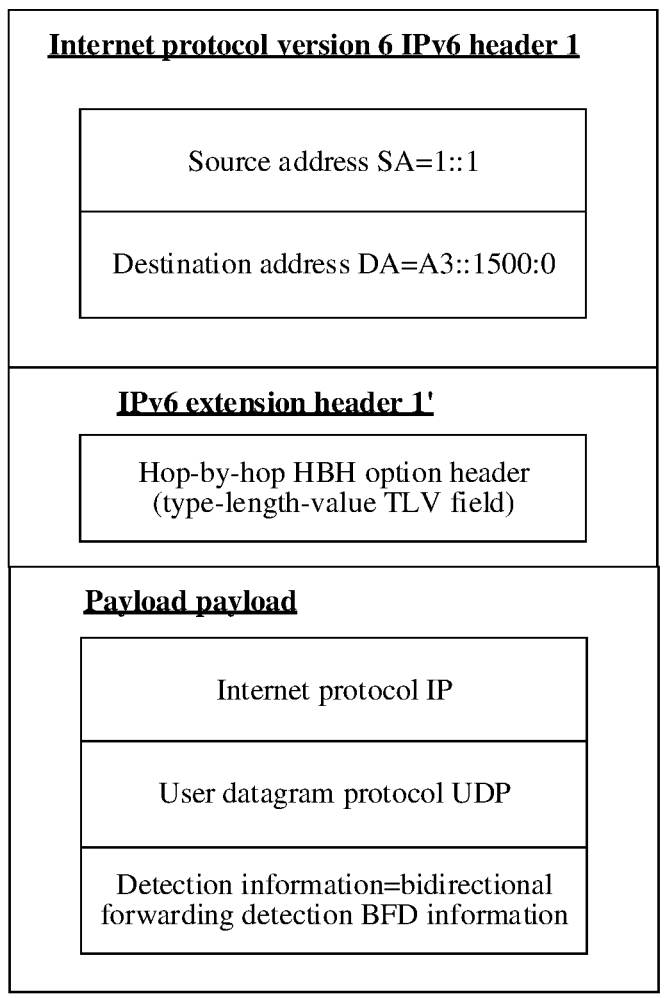
FIG. 6a is a schematic diagram of a format of a packet 1 according to an embodiment of this application.
Figure 6B:
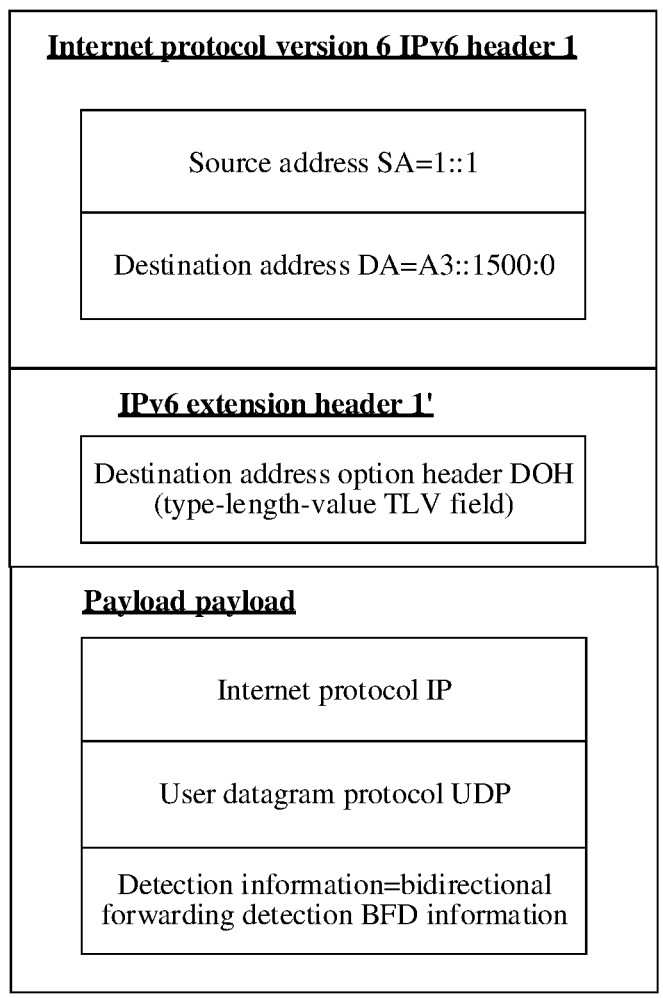
FIG. 6b is a schematic diagram of a format of another packet 1 according to an embodiment of this application.
Figure 6C:
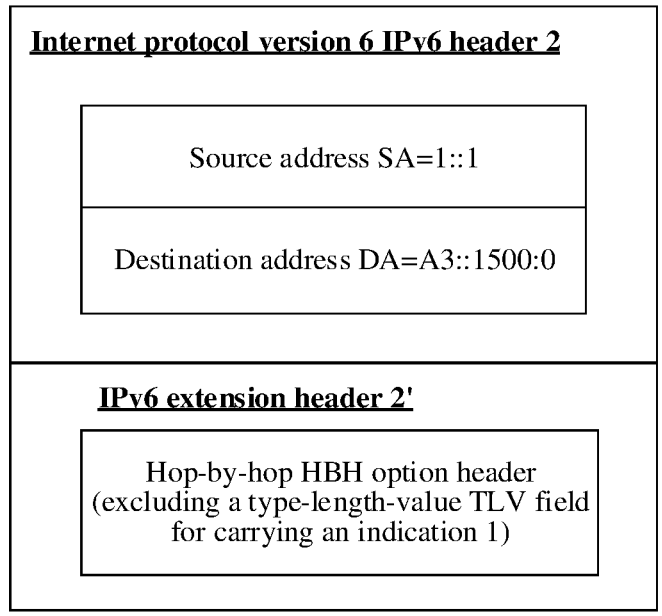
FIG. 6c is a schematic diagram of a format of a packet 2 corresponding to FIG. 6a according to an embodiment of this application.

In still another example, in a case, the indication 51 may be carried in a type-length-value (TLV) field in a hop-by-hop (HBH) option header of the IPv6 extension header 1'. The HBH option header of the IPv6 extension header 1' includes the TLV field, indicating that the packet 41 is a detection packet. A payload of the packet 41 may include detection information. A schematic diagram of a format of the packet 41 is shown in FIG. 6*a*. The packet 41 may include an IPv6 header 1, an IPv6 extension header 1', and a payload. The IPv6 header 1 may include an SA field and a DA field. The IPv6 extension header 1' may include an HBH option header. The payload may include IP, UDP, and detection information. The HBH option header includes a TLV field, and the detection information may be BFD information. In another case, the indication 51 may alternatively be carried in a TLV field in a destination option header (DOH) of the IPv6 extension header 1', and the DOH of the IPv6 extension header 1' includes the TLV field, indicating that the packet 41 is a detection packet. A payload of the packet 41 may include detection information. A schematic diagram of a format of the packet 41 is shown in FIG. 6*b*. The packet 41 may include an IPv6 header 1, an IPv6 extension header 1', and a payload. The IPv6 header 1 may include an SA field and a DA field. The IPv6 extension header 1' may include a DOH. The payload may include IP, UDP, and detection information. The DOH includes a TLV field, and the detection information may be BFD information.

In the foregoing examples, descriptions are provided by using an example in which the packet 41 is a BFD packet. If the packet 41 is an OAM packet, for a manner of carrying the indication 51 and the identification information of the service 1, refer to implementation of the foregoing examples. In this case, the detection information in the payload of the packet 41 may be OAM information. The OAM information may include, for example, a quantity of data packets sent by the PE device 11 to the PE device 12 and a timestamp.

It should be noted that the foregoing manners in which the packet 41 carries the indication 51 are all examples, and the packet 41 may carry the indication 51 in any other possible manner.

S102: The PE device 11 sends the packet 41 to the PE device 12.

In some possible implementations, if a link on which or a device via which the PE device 11 sends the packet 41 to the PE device 12 is faulty, and the packet 41 cannot be successfully sent to the PE device 12, the PE device 12 cannot receive the packet 41 sent by the PE device 11. Therefore, the PE device 11 does not receive, within preset duration, a response packet sent by the PE device 12, and may determine that a path that is between the PE device 11 and the CE device 22 and that is for carrying the service 1 is faulty. Content of the fault corresponding to that the PE device 12 cannot successfully receive the packet 41 may include: A link between the PE device 11 and the P device 31 is faulty, a link between the P device 31 and the PE device 12 is faulty, the P device 31 is faulty, or the PE device 12 is faulty.

In some other possible implementations, the PE device 12 can successfully receive the packet 41. In other words, after S102, S103 and S104 are further included in the method 100.

In this case, detection may be implemented according to the method 100. For a related implementation, refer to the following descriptions.

S103: The PE device 12 receives the packet 41 sent by the PE device 11.

During specific implementation, when there is a requirement for detecting the path for carrying the service 1, S102 and S103 may be performed to implement corresponding detection. Alternatively, the path for carrying the service may be detected periodically, to be specific, S102 and S103 are performed in each periodicity to implement corresponding detection, where a detection periodicity may be flexibly set based on an actual requirement.

S104: The PE device 12 detects, based on the indication 51 and the identification information of the service 1, at least one of a path that is between the PE device 11 and the PE device 12 and that is for carrying the service 1 and a path that is between the PE device 12 and the CE device 22 and that is for carrying the service 1.

During specific implementation, after receiving the packet 41, the PE device 12 may detect, based on the indication 51 and the identification information of the service 1 that are in the packet 41, the path for carrying the service 1. In one aspect, the PE device 12 may detect the path that is between the PE device 11 and the PE device 12 and that is used to carry the service 1, for example, detect whether the link between the PE device 12 and the P device 31 is faulty, and for another example, detect whether an interface used by the PE device 12 to connect to the P device 31 is faulty. In another aspect, the PE device 12 may alternatively detect a path that is between the PE device 12 and the access-side network device (for example, the CE device 22) and that is used to carry the service 1, for example, detect whether a link between the PE device 12 and the CE device 22 is faulty, and for another example, detect whether an interface used by the PE device 12 to connect to the CE device 22 is faulty.

If the PE device 12 detects that the path for carrying the service 1 is not faulty or path quality meets a requirement, the PE device 12 may return a response packet to the PE device 11, where the response packet is used to notify the PE device 11 that the path for carrying the service 1 is normal.

If the PE device 12 detects that the path for carrying the service 1 is faulty or path quality does not meet a requirement, the PE device 12 may not respond to the packet 41, or the PE device 12 may send, to the PE device 11, a response packet used to notify that a fault occurs or the path quality does not meet the requirement.

In an example, when the PE device 12 determines that the path for carrying the service 1 is faulty or the path quality does not meet the requirement, for example, when the PE device 12 perceives that the local interface used to connect to the CE device 22 is faulty, the link used by the PE device 12 to connect to the CE device 22 is faulty, or quality of the path used by the PE device 12 to connect to the PE device 11 does not meet the requirement (where for example, a delay exceeds a preset delay threshold), after S104, the method may further include: The PE device 12 sends a response packet to the PE device 11; and after receiving the response packet, the PE device 11 may determine, based on the response packet, a path status of at least one of the path that is between the PE device 11 and the PE device 12 and that is for carrying the service 1 and the path that is between the PE device 12 and the CE device 22 and that is for carrying the service 1. The path status includes connectivity and/or quality of a corresponding path. The response packet may include but is not limited to local status information of the PE device 12, status information of a link between the PE device 12 and the access-side network device, and status information of an interface used by the PE device 12 to connect to the access-side network device. In addition, the response packet may further include status information of the path between the PE device 12 and the PE device 11 and status information of an interface used by the PE device 12 to connect to a network-side network device. The PE device 11 may determine, based on the response packet, quality and connectivity of the path for carrying the service 1. Alternatively, the PE device 11 may more accurately determine, based on the response packet, a status of each path segment on the path for carrying the service 1, for example, link quality or a specific fault location. For example, the PE device 11 may determine a status of the link between the PE device 12 and the P device 31, a status of the link between the PE device 12 and the CE device 22, a status of the interface used by the PE device 12 to connect to the P device 31, or a status of the interface used by the PE device 12 to connect to the CE device 22.

It should be noted that, in a possible case, if the entire PE device 12 is faulty, the PE device 12 cannot send the response packet to the PE device 11 anymore. In another possible case, even if the PE device 12 determines that there is a fault on a path associated with the PE device 12, the PE device 12 may still notify the PE device 11 of existence of the fault by using the response packet. For example, assuming that there is the fault on the path that is between the PE device 11 and the PE device 12 and that is for carrying the service 1, the PE device 12 may select another reachable path to send the response packet to the PE device 11, to notify the PE device 11 that the path used to carry the service 1 is faulty.

In another example, when the PE device 12 determines that the path for carrying the service 1 is faulty or the path quality does not meet the requirement, the PE device 12 may not send the response packet, and this may specifically include but is not limited to the following: The response packet is not sent when it is determined that there is a fault in a detection mechanism; or the response packet cannot be sent due to a fault on the link between the PE device 12 and the P device 31, a fault on the interface used by the PE device 12 to connect to the P device 31, or another reason. Preset duration (for example, 1 second) may be set in the PE device 11, and the preset duration may be maximum allowable time that is preset by the PE device 11 and that is for waiting to receive the response packet after sending the detection packet. In this case, after the preset duration starting from sending the packet 41, the PE device 11 still does not receive the response packet sent by the PE device 12 for the packet 41, the PE device 11 may determine that the path that is between the PE device 11 and the CE device 22 and that is for carrying the service 1 is faulty or the path quality does not meet the requirement. A case in which the path for carrying the service 1 is faulty may include but is not limited to: The PE device 12 is faulty, the P device 31 is faulty, the CE device 22 is faulty, the link between the PE device 11 and the P device 31 is faulty, the link between the P device 31 and the PE device 12 is faulty, the link between the PE device 12 and the CE device 22 is faulty, the interface between the PE device 11 and the P device 31 is faulty, the interface between the P device 31 and the PE device 12 is faulty, the interface between the PE device 12 and the CE device 22 is faulty, or a device, a link, or an interface in a customer network connected to the PE device 12 is faulty.

In a possible implementation, if the packet 41 is a BFD packet, the PE device 11 sends the BFD packet to the PE device 12, to not only perceive whether the path that is between the PE device 11 and the PE device 12 and that is for carrying the service 1 is faulty, but also perceive, based on the identification information of the service 1 in the BFD packet, whether the path that is between the PE device 12 and the access-side network device (for example, the CE device 22) and that is for carrying the service 1 is faulty. In this way, the PE device 11 may perceive, by using the BFD packet, the connectivity of the entire path for carrying the service 1, to achieve an effect of service-level connectivity detection.

In another possible implementation, if the packet 41 is an OAM packet, the PE device 11 sends the OAM packet to the PE device 12, to detect the connectivity and the quality of the path for carrying the service 1. Path quality detection is used as an example. In a case, for example, a process in which the OAM packet implements path quality detection may include: The PE device 11 sends the OAM packet to the PE device 12, to notify statistical information (for example, information such as a quantity of sent data packets and a timestamp) of a service data packet that has been sent by the PE device 11. The PE device 12 may determine, based on a VPN SID carried in the OAM packet, a service 1 corresponding to a to-be-detected VPN, to process a statistical result of the received data packet that is obtained by the PE device 12 in the device and that corresponds to the to-be-detected service 1 and the statistical information in the received OAM packet, and obtain a quality detection result corresponding to a path for carrying the to-be-detected service 1. Then, the PE device 12 may generate an OAM response packet carrying the detection result and send the packet to the PE device 11, to indicate the PE device 11 to obtain, from the received OAM response packet, the quality detection result of the path for carrying the to-be-detected service 1, and determine quality of the path for carrying the to-be-detected service. In another case, for example, a process in which the OAM packet implements path quality detection may alternatively include: The PE device 11 sends the OAM packet to the PE device 12, to notify the PE device 12 of statistical information of a sent service data packet. The PE device 12 may determine, based on a VPN SID carried in the OAM packet, a service 1 corresponding to a to-be-detected VPN, include, in an OAM packet used for responding, a statistical result of the received data packet that is obtained by the PE device 12 and that corresponds to the to-be-detected service 1, and send the packet to the PE device 11. In this way, the PE device 11 performs processing based on the received response OAM packet, and obtains a quality detection result of a path for carrying the to-be-detected service 1, to determine quality of the path for carrying the to-be-detected service 1. In the foregoing two cases, unidirectional detection is used as an example. In another possible case, the PE device 11 and the PE device 12 may alternatively perform bidirectional detection on the path for carrying the service. For example, the PE device 11 sends an OAM packet to the PE device 12, to notify statistical information of a service data packet that has been sent by the PE device 11, and receives a response packet sent by the PE device 12. The response packet may indicate the PE device 11 to collect statistics on a bidirectional path data packet of the service, and the response packet may further carry statistical information about collecting statistics on a data packet of the service on a return path. The PE device 11 may determine a bidirectional path quality detection result for the data packet of the service based on the response packet. In this way, the OAM packet is used as a detection packet. The response packet received by the PE device 11 may include at least one of the following three: a connectivity detection result of the path for carrying the service 1 (to be specific, whether at least one of the path that is between the PE device 11 and the PE device 12 and that is for carrying the service 1 and the path that is between the PE device 12 and the CE device 22 and that is for carrying the service 1 is faulty), a path quality detection result of the path for carrying the service 1 (to be specific, whether path quality of at least one of the path that is between the PE device 11 and the PE device 12 and that is for carrying the service 1 and the path that is between the PE device 12 and the CE device 22 and that is for carrying the service 1 meets the requirement), and a statistical result of the path quality of the path for carrying the service 1 (to be specific, a path quality parameter of at least one of the path that is between the PE device 11 and the PE device 12 and that is for carrying the service 1 and the path that is between the PE device 12 and the CE device 22 and that is for carrying the service 1, where the PE device 11 may process the path quality parameter to obtain a path quality detection result indicating whether the path quality meets the requirement). Path quality detection may refer to performing quality detection on a unidirectional path, or may refer to performing quality detection on a bidirectional path.

In some possible implementations, for example, S104 may include: If the PE device 12 determines that the packet 41 is a detection packet, and determines that detection to be performed based on the indication 51 is locally supported, the PE device 12 performs, according to a local fault detection policy, fault detection on the path for carrying the service 1. According to the local fault detection policy, the packet 41 may be sent to a corresponding detection process, and fault detection is performed in the corresponding detection process. For example, assuming that the packet 41 is a BFD detection packet, when determining that BFD detection is locally supported, the PE device 12 sends service-related content and detection information in the BFD detection packet to a local BFD process, to perform corresponding fault detection by using the BFD process. For another example, assuming that the packet 41 is an OAM detection packet, when determining that OAM detection is locally supported, the PE device 12 sends service-related content and detection information in the OAM detection packet to a local OAM instance, to perform corresponding detection in the OAM instance.

That detection to be performed based on the indication 51 is locally supported may mean that a corresponding detection function of detection indicated by the indication 51 is enabled through local configuration of the PE device. The service 1 may be, for example, a conventional VPN service 1 or an EVPN service 1. In a possible case, if the detection packet includes an SRH indicating tunnel information, content sent to the detection process may be content in which the SRH is removed from the detection packet.

In an example, if the packet 41 is shown in FIG. 5a, after determining that the DA field in the packet 41 matches the local VPN SID, the PE device 12 may determine, based on the indication 51 in the packet 41, that the packet 41 is a detection packet, and determine that the PE device 12 locally supports detection to be performed based on the indication 51, and the PE device 12 is a device that can perceive the service 1 (for example, the PE device 12 is an egress PE device). In this case, service-related content and detection information in the packet 41 are sent to a corresponding detection process, to perform fault detection in the corresponding detection process.

In another example, if the packet 41 is shown in FIG. 6a, after determining that the HBH option header of the IPv6 extension header 1' in the packet 41 includes the TLV field for carrying the indication 51, the PE device 12 may determine, based on the indication 51 in the packet 41, that the packet 41 is a detection packet, and determine that detection to be performed based on the indication 51 is locally supported, and the PE device 12 is a device that can perceive the service 1. Service-related content and detection information in the packet 41 are sent to a corresponding detection process, to perform fault detection in the corresponding detection process.

In still another example, if the packet 41 is shown in FIG. 6b, after determining that the DA field in the packet 41 matches the local VPN SID, the PE device 12 may determine that the DOH of the IPv6 extension header 1' in the packet 41 includes the TLV field for carrying the indication 51, determine, based on the indication 51 in the packet 41, that the packet 41 is a detection packet, and determine that detection to be performed based on the indication 51 is locally supported, and the PE device 12 is a device that can perceive the service 1. Service-related content and detection information in the packet 41 are sent to a corresponding detection process, to perform fault detection in the corresponding detection process.

In some possible implementations, the PE device 11 may further send, to the PE device 12, a service packet corresponding to the service 1. For example, the method 100 may further include the following step. S105: The PE device 11 sends a packet 42 to the PE device 12, where the packet 42 is a service packet used to carry the service 1, and the packet 42 does not include the indication 51.

Figure 6D:
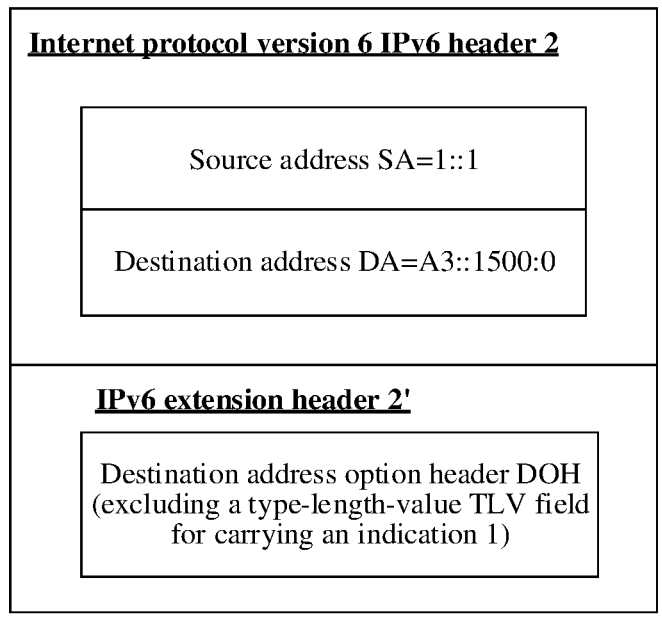
FIG. 6d is a schematic diagram of a format of a packet 2 corresponding to FIG. 6b according to an embodiment of this application.

In a case, the packet 2 does not include a field for carrying the indication 51. For example, the packet 41 carries the indication 51 by using the TLV field in the HBH option header of the IPv6 extension header 1'. In this case, the corresponding packet 42 is shown in FIG. 6b, and the HBH option header does not include the corresponding TLV field. For another example, the packet 41 carries the indication 51 by using the TLV field in the DOH of the IPv6 extension header 1'. In this case, the corresponding packet 42 is shown in FIG. 6d, and the DOH does not include the corresponding TLV field.

Figure 3C:
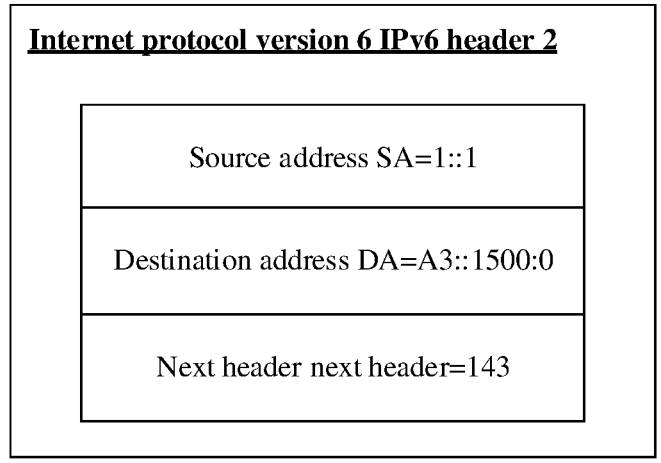
FIG. 3c is a schematic diagram of a format of a packet 2 corresponding to FIG. 3a according to an embodiment of this application.
Figure 3D:
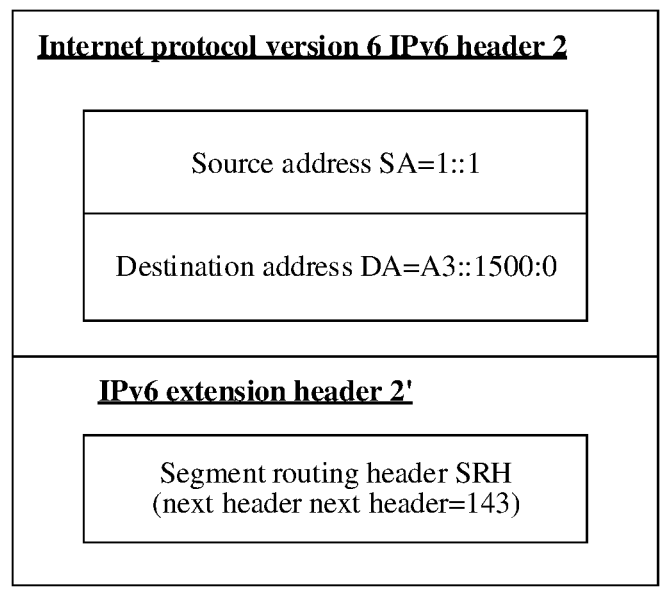
FIG. 3d is a schematic diagram of a format of a packet 2 corresponding to FIG. 3b according to an embodiment of this application.
Figure 4C:
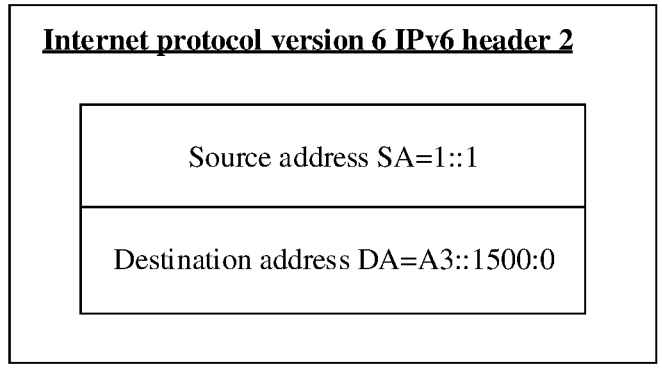
FIG. 4c is a schematic diagram of a format of a packet 2 corresponding to FIG. 4a according to an embodiment of this application.
Figure 4D:
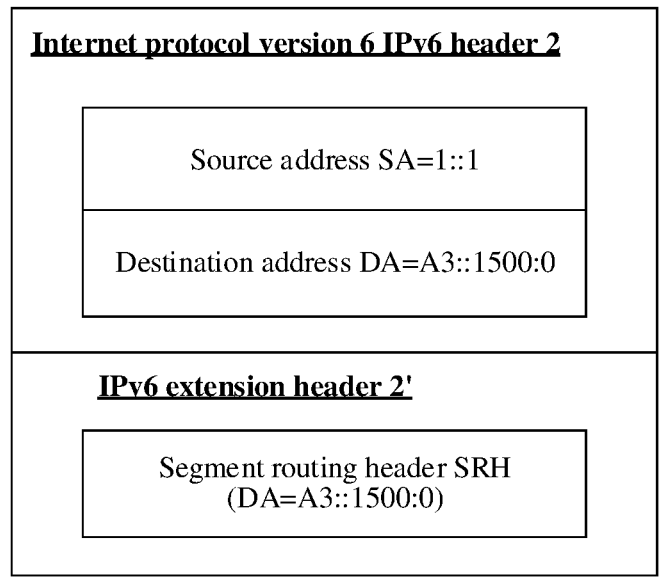
FIG. 4d is a schematic diagram of a format of a packet 2 corresponding to FIG. 4b according to an embodiment of this application.
Figure 5B:
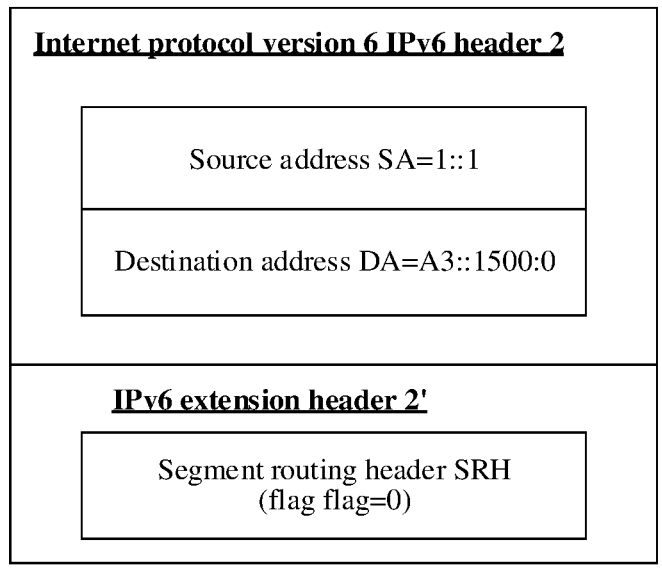
FIG. 5b is a schematic diagram of a format of a packet 2 corresponding to FIG. 5a according to an embodiment of this application.

In another case, the packet 42 includes a field for carrying the indication 51. The field carries the indication 52 in the packet 42. The indication 52 indicates that the packet 42 is a service packet, and the indication 52 is different from the indication 51. In an example, the packet 42 includes an IPv6 header 2, the indication 52 is carried in a next header field in the IPv6 header 2, and the indication 51 is a first value of the next header field in the IPv6 header 1. In this case, the indication 52 is a second value of the next header field in the IPv6 header 2, and the first value is different from the second value. For example, if the next header field in the IPv6 header 1 in the packet 41 is equal to 137, the corresponding packet 42 is shown in FIG. 3c, and the next header field in the IPv6 header 2 in the packet 42 is equal to 143. In another example, the packet 42 includes an IPv6 extension header 2', the indication 52 is carried in a next header field in an SRH of the IPv6 extension header 2', and the indication 51 is a first value of the next header field in the SRH of the IPv6 extension header 1'. In this case, the indication 52 is a second value of the next header field in the SRH of the IPv6 extension header 2', and the first value is different from the second value. For example, if the next header field in the SRH of the IPv6 extension header 1' in the packet 41 is equal to 137, the corresponding packet 42 is shown in FIG. 3d, and the next header field in the SRH of the IPv6 extension header 2' in the packet 42 is equal to 143. In the foregoing examples in FIG. 3c and FIG. 3d, that values of the next header field in the packet 42 are all 143 is used as an example. During actual application, values of the next header field in the packet 42 in FIG. 3c and FIG. 3d may alternatively be different. In still another example, the packet 42 includes an IPv6 header 2, the indication 52 is carried in an args field in a DA field in the IPv6 header 2, and the indication 51 is a third value of the args field in the DA field in the IPv6 header 1. In this case, the indication 52 is a fourth value of the args field in the DA field in the IPv6 header 2, and the third value is different from the fourth value. For example, if the args field in the DA field in the IPv6 header 1 in the packet 41 is equal to 3, the corresponding packet 42 is shown in FIG. 4c, and the args field in the DA field in the IPv6 header 2 in the packet 42 is equal to 0. In yet another example, the packet 42 includes an IPv6 extension header 2', the indication 52 is carried in an args field in a DA field in an SRH of the IPv6 extension header 2', and the indication 51 is a third value of the args field in the DA field in the SRH of the IPv6 extension header 1'. In this case, the indication 52 is a fourth value of the args field in the DA field in the SRH of the IPv6 extension header 2', and the third value is different from the fourth value. For example, if the args field in the DA field in the SRH of the IPv6 extension header 1' in the packet 41 is equal to 3, the corresponding packet 42 is shown in FIG. 4d, and the args field in the DA field in the SRH of the IPv6 extension header 2' in the packet 42 is equal to 0. In the foregoing examples in FIG. 4c and FIG. 4d, that values of the DA field in the packet 42 are all 0 is used as an example. During actual application, values of the args field in the packet 42 in FIG. 4c and FIG. 4d may alternatively be different. In still another example, the packet 42 includes an IPv6 extension header 2', the indication 52 is carried in a flag field in an SRH of the IPv6 extension header 2', and the indication 51 is a fifth value of the flag field in the SRH of the IPv6 extension header 1'. In this case, the indication 52 is a sixth value of the flag field in the SRH of the IPv6 extension header 2', and the fifth value is different from the sixth value. For example, if the flag field in the SRH of the IPv6 extension header 1' in the packet 41 is equal to 1, the corresponding packet 42 is shown in FIG. 5b, and the flag field in the SRH of the IPv6 extension header 2' in the packet 42 is equal to 0.

In this way, the receiver PE device 12 can identify, by parsing the received packet, whether the received packet is a detection packet or a service packet, to perform corresponding processing. For example, the PE device 12 obtains the indication 51 by parsing the received packet 41, and determines, based on the indication 51, that the packet 41 is a detection packet, to perform S104. For another example, the PE device 12 determines, by parsing the packet 42, that the packet 42 that does not include the indication 51 is a service packet, to perform a corresponding operation such as forwarding the service packet according to a processing rule of the service packet.

In some possible implementations, after the PE device 11 determines that at least one of the path that is between the PE device 11 and the PE device 12 and that is for carrying the service 1 and the path that is between the PE device 12 and the CE device 22 and that is for carrying the service 1 is faulty, to ensure normal running of the service, the PE device 11 may alternatively switch the path used to carry the service 1 to a path from the PE device 11 to the PE device 13, and the PE device 13 carries the service 1 after the switching. Before the switching, a service packet corresponding to the service 1 reaches the CE device 22 successively through the PE device 11, the P device 31, and the PE device 12. After the switching, the service packet corresponding to the service 1 reaches the CE device 22 successively through the PE device 11, the P device 32, the P device 33, and the PE device 13. However, regardless of before the switching or after the switching, a service packet corresponding to the service 2 reaches the CE device 22 successively through the PE device 11, the P device 31, and the PE device 12. This resolves a problem, in tunnel-level fault detection, that network resources are wasted because after a fault is detected, all services (including the service 1 and the service 2) on a tunnel are switched, and after the switching, both the service 1 and the service 2 reach the CE device 22 through the PE device 11, the P device 31, and the PE device 12, and improves accuracy of service control.

It can be learned that, according to the method 100 provided in this embodiment of this application, a sender network device adds the indication and the identification information of the service to the sent detection packet, so that a receiver network device can accurately distinguish whether the received packet is a detection packet or a service packet. When determining that the received packet is a detection packet, the receiver network device may determine a to-be-detected service based on the identification information of the service in the detection packet, and further detect a path for carrying the to-be-detected service, to implement finer-grained and more accurate service-level fault detection, provide an accurate basis for service-level switching, and ensure normal running of a service in a network.

Based on the foregoing method embodiment, an embodiment of this application provides an apparatus for implementing service path detection. The following describes the apparatus with reference to the accompanying drawings.

Figure 7:
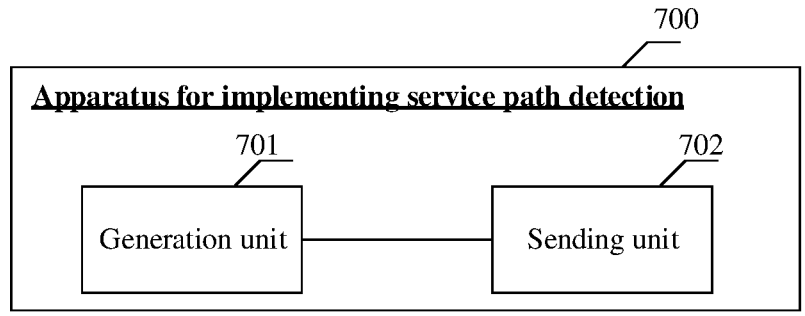
FIG. 7 is a schematic diagram of a structure of an apparatus 700 for implementing service path detection according to an embodiment of this application.

FIG. 7 is a schematic diagram of a structure of an apparatus 700 for implementing service path detection according to an embodiment of this application. The apparatus 700 is applied to a first network device, and may perform, for example, a function of the PE device 11 in the embodiment shown in FIG. 1. The apparatus 700 may include a generation unit 701 and a sending unit 702.

The generation unit 701 is configured to generate a first packet based on the internet protocol version 6 IPv6, where the first packet includes a first indication and identification information of a service, and the first indication indicates that the first packet is a detection packet.

When the apparatus 700 is applied to the PE device 11 shown in FIG. 1, for specific implementation of generating the first packet by the generation unit 701, refer to S101 in the embodiment shown in FIG. 2.

The sending unit 702 is configured to send the first packet to a second network device, so that the second network device that receives the first packet can detect, based on the first indication and the identification information of the service, at least one of a path that is between the first network device and the second network device and that is used to carry the service and a path that is between the second network device and an access-side network device and that is used to carry the service.

When the apparatus 700 is applied to the PE device 11 shown in FIG. 1, for specific implementation of sending the first packet by the sending unit 702, refer to S102 in the embodiment shown in FIG. 2.

The identification information of the service may be carried in a first IPv6 header or a first IPv6 extension header of the first packet.

The first indication may be carried in the first IPv6 header or the first IPv6 extension header of the first packet.

In an example, the first packet includes the first IPv6 header, and the first indication is carried in a next header next header field in the first IPv6 header; or the first packet includes the first IPv6 extension header, and the first indication is carried in a next header field in a first segment routing header SRH of the first IPv6 extension header. The first IPv6 extension header of the first packet further includes an alert label and a control word, the alert label and the control word indicate detection information in a payload of the first packet, and the detection information indicates the second network device to detect, based on the detection information, the path for carrying the service.

In another example, the first packet includes the first IPv6 header, and the first indication is carried in an arguments args field in a first destination address DA field in the first IPv6 header; or the first packet includes the first IPv6 extension header, and the first indication is carried in an args field in a first DA field in a first SRH of the first IPv6 extension header.

In still another example, the first packet includes the first IPv6 extension header, and the first indication is carried in a flags field in an SRH of the first IPv6 extension header.

In yet another example, the first packet includes the first IPv6 extension header, and the first indication is carried in a type-length-value TLV field in a hop-by-hop HBH option header of the first IPv6 extension header, or carried in a TLV field in a destination option header DOH of the first IPv6 extension header.

In some possible implementations, the sending unit 702 is further configured to send a second packet to the second network device, where the second packet is a service packet used to carry the service, and the second packet does not include the first indication.

When the apparatus 700 is applied to the PE device 11 shown in FIG. 1, for specific implementation of sending the second packet by the sending unit 702, refer to S105 in the embodiment shown in FIG. 2.

The second packet may further include a second indication, the second indication indicates that the second packet is a service packet, and the second indication is different from the first indication.

The second indication being different from the first indication may include: The second packet includes a second IPv6 header, the second indication is carried in a next header field in the second IPv6 header, the first indication is a first value of the next header field in the first IPv6 header, and the second indication is a second value of the next header field in the second IPv6 header; the second packet includes a second IPv6 extension header, the second indication is carried in a next header field in a second SRH of the second IPv6 extension header, the first indication is a first value of the next header field in the first SRH of the first IPv6 extension header, and the second indication is a second value of the next header field in the second SRH; the second packet includes a second IPv6 header, the second indication is carried in an args field in a second DA field in the second IPv6 header, the first indication is a third value of the args field in the first DA field in the first IPv6 header, and the second indication is a fourth value of the args field in the second DA field; the second packet includes a second IPv6 extension header, the second indication is carried in an args field in a second DA field in a second SRH of the second IPv6 extension header, the first indication is a third value of the args field in the first DA field in the first SRH of the first IPv6 extension header, and the second indication is a fourth value of the args field in the second DA field in the second SRH; or the second packet includes a second IPv6 extension header, the second indication is carried in a flags field in an SRH of the second IPv6 extension header, the first indication is a fifth value of the flags field in the SRH of the first IPv6 extension header, and the second indication is a sixth value of the flags field in the SRH of the second IPv6 extension header.

In some possible implementations, the apparatus 700 may further include a determining unit. The determining unit is configured to: if a response packet of the second network device for the first packet is not received within preset duration, determine that a path that is between the first network device and the access-side network device and that is used to carry the service is faulty.

In some possible implementations, the apparatus 700 may further include a receiving unit and a determining unit. The receiving unit is configured to receive a response packet of the second network device for the first packet; and the determining unit is configured to determine, based on the response packet, a path status of at least one of the path that is between the first network device and the second network device and that is used to carry the service and the path that is between the second network device and the access-side network device and that is used to carry the service. The path status includes at least one of path connectivity and path quality.

In some possible implementations, the apparatus 700 may further include a switching unit. The switching unit is configured to: when determining, based on a fact that the response packet of the second network device for the first packet is not received within the preset duration, that the path used to carry the service is faulty, or determining, based on the path status, that the path used to carry the service is faulty or does not meet a path quality requirement, switch the path used to carry the service to a path from the first network device to a third network device, where the third network device carries the service after the switching.

For specific executable functions and implementations of the apparatus 700 for implementing service path detection, refer to corresponding descriptions of the PE device 11 in the embodiment shown in FIG. 2. Details are not described herein again.

Figure 8:
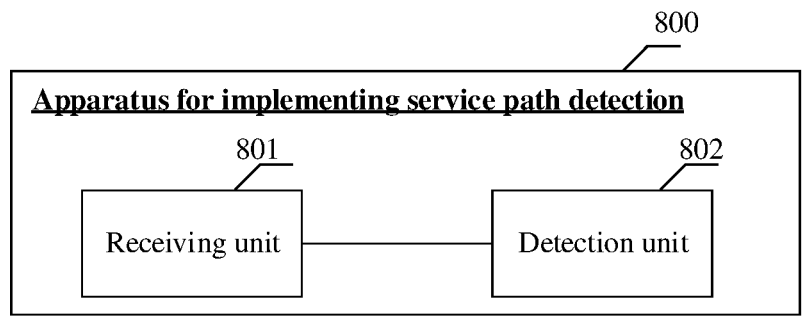
FIG. 8 is a schematic diagram of a structure of an apparatus 800 for implementing service path detection according to an embodiment of this application.

In addition, an embodiment of this application further provides an apparatus 800 for implementing service path detection. As shown in FIG. 8, the apparatus 800 is applied to a second network device, and may perform, for example, a function of the PE device 12 in the embodiment shown in FIG. 1. The apparatus 800 may include a receiving unit 801 and a detection unit 802.

The receiving unit 801 is configured to receive a first packet sent by a first network device, where the first packet includes a first indication and identification information of a service, and the first indication indicates that the first packet is a detection packet.

When the apparatus 800 is applied to the PE device 12 shown in FIG. 1, for specific implementation of receiving the first packet by the receiving unit 801, refer to S103 in the embodiment shown in FIG. 2.

The detection unit 802 is configured to detect, based on the first indication and the identification information of the service, at least one of a path that is between the first network device and the second network device and that is for carrying the service and a path that is between the second network device and an access-side network device and that is for carrying the service.

When the apparatus 800 is applied to the PE device 12 shown in FIG. 1, for specific implementation of detecting, by the detection unit 802, the path for carrying the service, refer to S104 in the embodiment shown in FIG. 2.

The identification information of the service may be carried in a first IPv6 header or a first IPv6 extension header of the first packet.

The first indication may be carried in the first IPv6 header or the first IPv6 extension header of the first packet.

In an example, the first packet includes the first IPv6 header, and the first indication is carried in a next header next header field in the first IPv6 header; or the first packet includes the first IPv6 extension header, and the first indication is carried in a next header field in a first segment routing header SRH of the first IPv6 extension header. The first IPv6 extension header of the first packet further includes an alert label and a control word, the alert label and the control word indicate detection information in a payload of the first packet, and the detection information indicates the second network device to detect, based on the detection information, the path for carrying the service.

In another example, the first packet includes the first IPv6 header, and the first indication is carried in an arguments args field in a first destination address DA field in the first IPv6 header; or the first packet includes the first IPv6 extension header, and the first indication is carried in an args field in a first DA field in a first SRH of the first IPv6 extension header.

In still another example, the first packet includes the first IPv6 extension header, and the first indication is carried in a flags field in an SRH of the first IPv6 extension header.

In yet another example, the first packet includes the first IPv6 extension header, and the first indication is carried in a type-length-value TLV field in a hop-by-hop HBH option header of the first IPv6 extension header, or carried in a TLV field in a destination option header DOH of the first IPv6 extension header.

In some possible implementations, the receiving unit 801 is further configured to receive a second packet sent by the first network device, where the second packet is a service packet used to carry the service, and the second packet does not include the first indication. When the apparatus 800 is applied to the PE device 12 shown in FIG. 1, for specific implementation of receiving the second packet by the receiving unit 801, refer to S105 in the embodiment shown in FIG. 2.

The second packet may further include a second indication, the second indication indicates that the second packet is a service packet, and the second indication is different from the first indication.

The second indication being different from the first indication may include: The second packet includes a second IPv6 header, the second indication is carried in a next header field in the second IPv6 header, the first indication is a first value of the next header field in the first IPv6 header, and the second indication is a second value of the next header field in the second IPv6 header; the second packet includes a second IPv6 extension header, the second indication is carried in a next header field in a second SRH of the second IPv6 extension header, the first indication is a first value of the next header field in the first SRH of the first IPv6 extension header, and the second indication is a second value of the next header field in the second SRH; the second packet includes a second IPv6 header, the second indication is carried in an args field in a second DA field in the second IPv6 header, the first indication is a third value of the args field in the first DA field in the first IPv6 header, and the second indication is a fourth value of the args field in the second DA field; the second packet includes a second IPv6 extension header, the second indication is carried in an args field in a second DA field in a second SRH of the second IPv6 extension header, the first indication is a third value of the args field in the first DA field in the first SRH of the first IPv6 extension header, and the second indication is a fourth value of the args field in the second DA field in the second SRH; or the second packet includes a second IPv6 extension header, the second indication is carried in a flags field in an SRH of the second IPv6 extension header, the first indication is a fifth value of the flags field in the SRH of the first IPv6 extension header, and the second indication is a sixth value of the flags field in the SRH of the second IPv6 extension header.

In some possible implementations, the apparatus 800 may further include a sending unit. The sending unit is configured to send a response packet to the first network device, to indicate the first network device to determine, based on the response packet, a path status of at least one of the path that is between the first network device and the second network device and that is for carrying the service and the path that is between the second network device and the access-side network device and that is for carrying the service, where the path status includes at least one of path connectivity and path quality. The response packet sent by the second network device includes interface status information of the second network device, and the interface status information indicates the first network device to determine whether the path that is between the second network device and the access-side network device and that is for carrying the service is faulty or path quality is good or bad.

In some possible implementations, the detection unit 802 may be specifically configured to: if it is determined that the first packet is a detection packet, and it is determined that detection to be performed based on the first indication is locally supported, detect, according to a local detection policy, the path for carrying the service.

For specific executable functions and implementations of the apparatus 800 for implementing service path detection, refer to corresponding descriptions of the PE device 12 in the embodiment shown in FIG. 2. Details are not described herein again.

The foregoing apparatus 700 for implementing service path detection may be an ingress PE device carrying the service, and the apparatus 800 for implementing service path detection may be an egress PE device carrying the service.

The service carried between the apparatus 700 for implementing service path detection and the apparatus 800 for implementing service path detection may be an L2VPN service. The L2VPN service may include, for example, a service carried in a conventional VPN technology or an EVPN technology. Both the conventional VPN service and the EVPN service may use a VLL service model or a VPLS model.

In the apparatus 700 for implementing service path detection and the apparatus 800 for implementing service path detection, the first packet may be a BFD packet, or may be an OAM packet.

Figure 9:
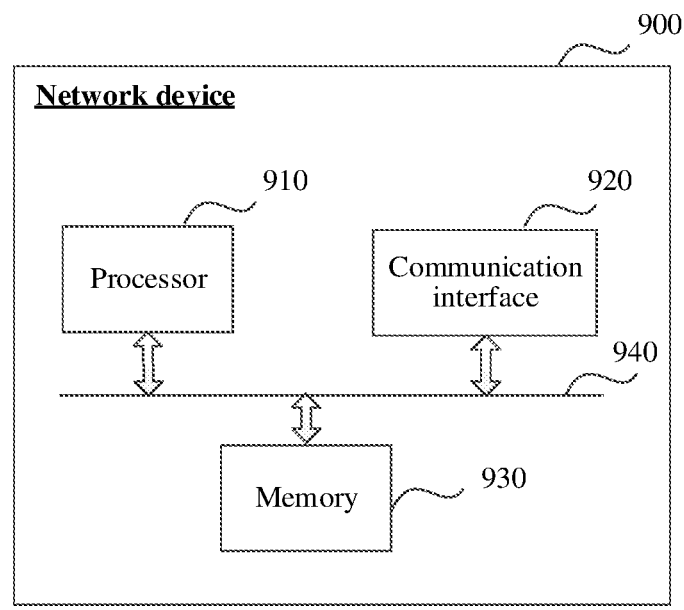
FIG. 9 is a schematic diagram of a structure of a network device 900 according to an embodiment of this application.

FIG. 9 is a schematic diagram of a structure of a network device 900 according to an embodiment of this application. The network device 900 may be, for example, any PE device in the embodiment shown in FIG. 1, or may be a device implementation of the apparatus for implementing service path detection in the embodiment shown in FIG. 7 or FIG. 8.

Refer to FIG. 9. The network device 900 includes a processor 910, a communication interface 920, and a memory 930. There may be one or more processors 910 in the network device 900, and one processor is used as an example in FIG. 9. In this embodiment of this application, the processor 910, the communication interface 920, and the memory 930 may be connected by using a bus system or in another manner. In FIG. 9, an example in which the processor 910, the communication interface 920, and the memory 930 are connected by using a bus system 940 is used.

The processor 910 may be a CPU, an NP, or a combination of the CPU and the NP. The processor 910 may further include a hardware chip. The hardware chip may be an application-specific integrated circuit (ASIC), a programmable logic device (PLD), or a combination thereof. The foregoing PLD may be a complex programmable logic device (CPLD), a field-programmable gate array (FPGA), a generic array logic (GAL), or any combination thereof.

When the network device 900 includes a first network device, the processor 910 may perform related functions such as generating a first packet including a first indication and identification information of a service, and sending the first packet to a second network device in the foregoing method embodiment. When the network device 900 is a second network device, the processor 910 may perform related functions such as receiving, from a first network device, a first packet including a first indication and identification information of a service, and detecting, based on the first indication and the identification information of the service, a path for carrying the service in the foregoing method embodiment.

The communication interface 920 is configured to receive and send a packet. Specifically, the communication interface 920 may include a receiving interface and a sending interface. The receiving interface may be configured to receive the packet, and the sending interface may be configured to send the packet. There may be one or more communication interfaces 920. In a possible implementation, the communication interface 920 may be configured to implement a function of the sending unit 702 shown in FIG. 7 or the receiving unit 801 shown in FIG. 8.

The memory 930 may include a volatile memory, for example, a random access memory (RAM). Alternatively, the memory 930 may include a non-volatile memory, for example, a flash memory, a hard disk drive (HDD), or a solid-state drive (SSD). The memory 930 may further include a combination of the foregoing types of memories. For example, the memory 930 may store the identification information of the service mentioned above.

Optionally, the memory 930 stores an operating system and a program, an executable module or a data structure, a subset thereof, or an extended set thereof. The program may include various operation instructions used to implement various operations. The operating system may include various system programs, to implement various basic services and process hardware-based tasks. The processor 910 may read a program in the memory 930, to implement the method for implementing service path detection provided in embodiments of this application. In a possible implementation, the memory 930 may store program code such as program code used to implement a function of the generation unit 701 shown in FIG. 7 or the detection unit 802 shown in FIG. 8.

The memory 930 may be a memory component in the network device 900, or may be a storage apparatus independent of the network device 900.

The bus system 940 may be a peripheral component interconnect (PCI) bus, an extended industry standard architecture (EISA) bus, or the like. The bus system 940 may be classified into an address bus, a data bus, a control bus, and the like. For ease of representation, only one bold line is used to represent the bus in FIG. 9, but this does not mean that there is only one bus or only one type of bus.

Figure 10:
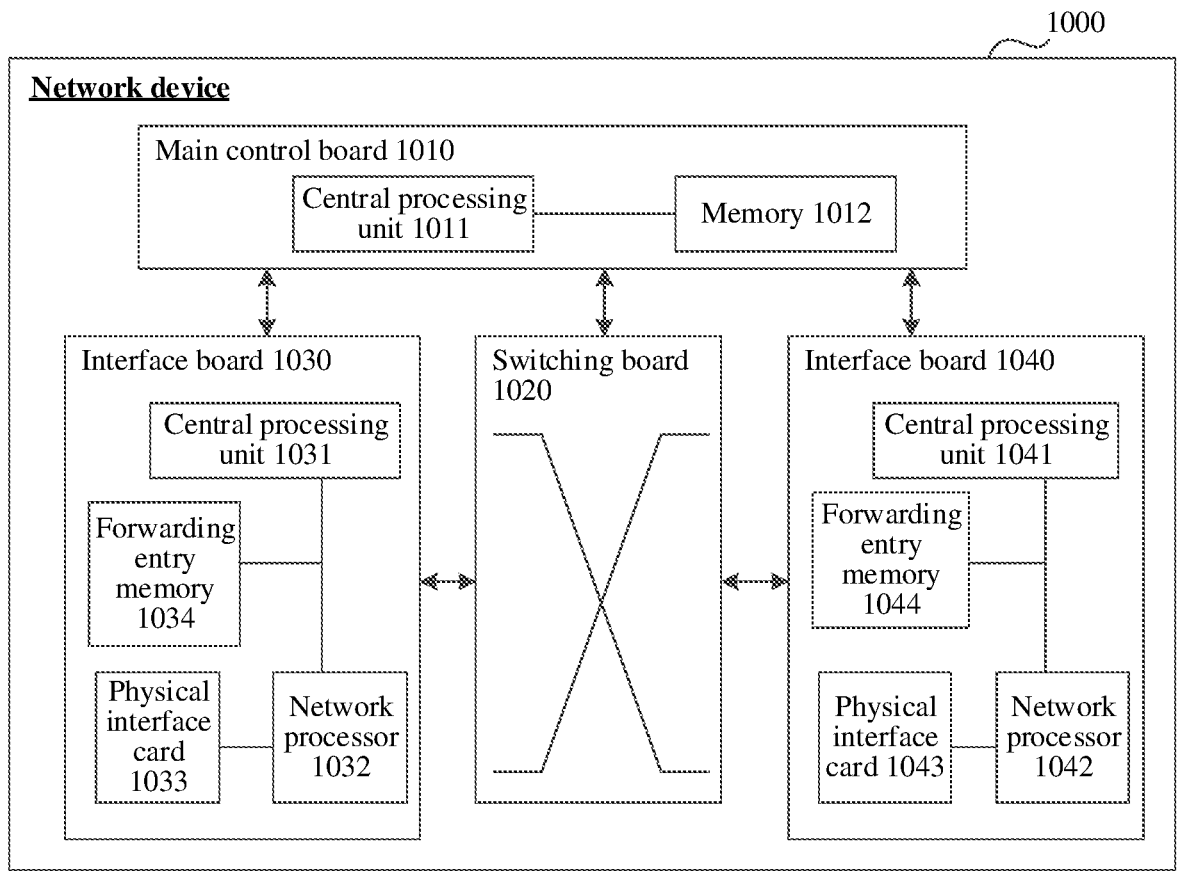
FIG. 10 is a schematic diagram of a structure of a network device 1000 according to an embodiment of this application.

FIG. 10 is a schematic diagram of a structure of another network device 1000 according to an embodiment of this application. The network device 1000 may be configured as any PE device in the embodiment shown in FIG. 1, or may be a device implementation of the apparatus for implementing service path detection in the embodiment shown in FIG. 7 or FIG. 8.

The network device 1000 includes a main control board 1010 and an interface board 1030.

The main control board 1010 is also referred to as a main processing unit (MPU) or a route processor card. The main control board 1010 controls and manages each component in the network device 1000, including functions of route calculation, device management, device maintenance, and protocol processing. The main control board 1010 includes a central processing unit 1011 and a memory 1012.

The interface board 1030 is also referred to as a line processing unit card (LPU), a line card, or a service board. The interface board 1030 is configured to provide various service interfaces and implement data packet forwarding. The service interface includes but is not limited to an Ethernet interface, a POS (Packet over SONET/SDH) interface, and the like. The Ethernet interface is, for example, a flexible Ethernet Clients (FlexE Clients). The interface board 1030 includes: a central processing unit 1031, a network processor 1032, a forwarding entry memory 1034, and a physical interface card (PIC) 1033.

The central processing unit 1031 on the interface board 1030 is configured to: control and manage the interface board 1030 and communicate with the central processing unit 1011 on the main control board 1010.

The network processor 1032 is configured to implement packet forwarding processing. A form of the network processor 832 may be a forwarding chip. Specifically, processing of an uplink packet includes: processing of an inbound interface of the packet, and searching for a forwarding table, and processing of a downlink packet includes: searching for a forwarding table, and the like.

The physical interface card 1033 is configured to implement a physical layer interconnection function, so that original traffic enters the interface board 1030, and a processed packet is sent out from the physical interface card 1033. The physical interface card 1033 includes at least one physical interface, and the physical interface is also referred to as a physical interface. The physical interface card 1033 may also be referred to as a subcard, may be installed on the interface board 1030, and is responsible for converting an optical/electrical signal into a packet, performing validity check on the packet, and forwarding the packet to the network processor 1032 for processing. In some embodiments, the central processing unit 831 of the interface board 1030 may alternatively perform a function of the network processor 1032, for example, implement software forwarding based on a general-purpose CPU, so that the network processor 1032 is not required in the physical interface card 1033.

Optionally, the network device 1000 includes a plurality of interface boards. For example, the network device 1000 further includes an interface board 1040. The interface board 1040 includes a central processing unit 1041, a network processor 1042, a forwarding entry memory 1044, and a physical interface card 1043.

Optionally, the network device 1000 further includes a switching board 1020. The switching board 1020 may also be referred to as a switch fabric unit (SFU). When the network device has a plurality of interface boards 1030, the switching board 1020 is configured to complete data exchange between the interface boards. For example, the interface board 1030 and the interface board 1040 may communicate with each other by using the switching board 820.

The main control board 1010 and the interface board 1030 are coupled. For example, the main control board 1010, the interface board 1030, the interface board 1040, and the switching board 1020 are connected to a system backplane by using a system bus to implement interworking. In a possible implementation, an inter-process communication (IPC) channel is established between the main control board 1010 and the interface board 1030, and communication is performed between the main control board 1010 and the interface board 1030 by using the IPC channel.

Logically, the network device 1000 includes a control plane and a forwarding plane. The control plane includes the main control board 1010 and the central processing unit 1031, and the forwarding plane includes components that perform forwarding, such as the forwarding entry memory 1034, the physical interface card 1033, and the network processor 1032. The control plane performs functions such as a router, generating a forwarding table, processing signaling and protocol packets, and configuring and maintaining a device status. The control plane delivers the generated forwarding table to the forwarding plane. On the forwarding plane, the network processor 1032 searches a table and forwards, based on the forwarding table delivered by the control plane, the packet received by the physical interface card 1033. The forwarding table delivered by the control plane may be stored in the forwarding entry memory 1034. In some embodiments, the control plane and the forwarding plane may be completely separated, and are not on a same device.

If the network device 1000 is configured as a first network device, the central processing unit 1011 may generate a first packet including a first indication and identification information of a service. The network processor 1032 may trigger the physical interface card 1033 to send the first packet to a second network device.

If the network device 1000 is configured as a second network device, the central processing unit 1011 may receive, from a first network device, a first packet including a first indication and identification information of a service, and detect, based on the first indication and the identification information of the service, a path for carrying the service. The network processor 1032 may trigger the physical interface card 1033 to send a response packet to the first network device.

It should be understood that the sending unit 702 or the like in the apparatus 700 for implementing service path detection may be equivalent to the physical interface card 1033 or the physical interface card 1043 in the network device 1000. The generation unit 701 or the like in the apparatus 700 for implementing service path detection may be equivalent to the central processing unit 1011 or the central processing unit 1031 in the network device 1000. The receiving unit 801 or the like in the apparatus 800 for implementing service path detection may be equivalent to the physical interface card 1033 or the physical interface card 1043 in the network device 1000. The detection unit 802 or the like in the apparatus 800 for implementing service path detection may be equivalent to the central processing unit 1011 or the central processing unit 1031 in the network device 1000.

It should be understood that, in this embodiment of this application, an operation on the interface board 1040 is the same as an operation on the interface board 1030. For brevity, details are not described again. It should be understood that the network device 1000 in this embodiment may correspond to any node in the foregoing method embodiment. The main control board 1010, the interface board 1030, and/or the interface board 1040 in the network device 1000 may implement functions and/or various steps implemented by any node in the foregoing method embodiment. For brevity, details are not described herein again.

It should be understood that there may be one or more main control boards, and when there are a plurality of main control boards, an active main control board and a standby main control board may be included. There may be one or more interface boards. A stronger data processing capability of the network device indicates more provided interface boards. There may alternatively be one or more physical interface cards on the interface board. There may be no switching boards, or there may be one or more switching boards. If there are a plurality of switching boards, the switching boards can jointly implement load balancing and redundant backup. In a centralized forwarding architecture, the switching board may be not required in the network device, and the interface board processes service data of the entire system. In a distributed forwarding architecture, the network device may have at least one switching board, and data exchange between a plurality of interface boards is implemented by using the switching board, to provide large-capacity data exchange and processing capabilities. Therefore, data access and processing capabilities of the network device in the distributed architecture are greater than those of the device in the centralized architecture. Optionally, a form of the network device may alternatively be that there is only one board, that is, there is no switching board, and functions of the interface board and the main control board are integrated on the board. In this case, the central processing unit on the interface board and the central processing unit on the main control board may be combined into one central processing unit on the board to perform functions superimposed by the two central processing units. This form of device (for example, a network device such as a low-end switch or a router) has low data exchange and processing capabilities. An architecture to be used depends on a specific networking deployment scenario.

In some possible embodiments, the foregoing nodes may be implemented as virtualization devices. For example, the virtualization device may be a virtual machine (English: Virtual Machine, VM) running a program used to send a packet function, and the virtual machine is deployed on a hardware device (for example, a physical server). The virtual machine is a complete computer system that is simulated by software, has complete hardware system functions, and runs in a completely isolated environment. The virtual machine may be configured as each node. For example, each node may be implemented based on a general-purpose physical server in combination with a network functions virtualization (NFV) technology. Each node is a virtual host, a virtual router, or a virtual switch. Persons skilled in the art may virtualize, on a general-purpose physical server by reading this application with reference to the NFV technology, nodes having the foregoing functions. Details are not described herein again.

It should be understood that the network devices in the foregoing product forms have any function of each node in the foregoing method embodiments. Details are not described herein again.

Figure 11:
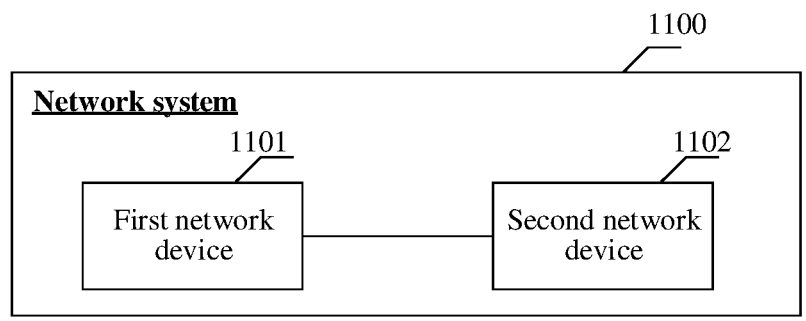
FIG. 11 is a schematic diagram of a structure of a network system 1100 according to an embodiment of this application.

An embodiment of this application further provides a network system 1100, as shown in FIG. 11. The network system 1100 may include a first network device 1101 and a second network device 1102. The first network device 1101 may be the PE device 11 shown in FIG. 1, the apparatus 700 for implementing service path detection shown in FIG. 7, the network device 900 configured as the first network device shown in FIG. 9, or the network device 1000 configured as the first network device shown in FIG. 10. The second network device 1102 may be the PE device 12 shown in FIG. 1, the apparatus 800 for implementing service path detection shown in FIG. 8, the network device 900 configured as the second network device shown in FIG. 9, or the network device 1000 configured as the second network device shown in FIG. 10.

An embodiment of this application further provides a chip, including a processor and an interface circuit. The interface circuit is configured to: receive instructions and transmit the instructions to the processor. The processor, for example, may be a specific implementation form of the apparatus 700 for implementing service path detection shown in FIG. 7, and may be configured to perform the foregoing method. For another example, the processor may be a specific implementation form of the apparatus 800 for implementing service path detection shown in FIG. 8, and may be configured to perform the foregoing method. The processor is coupled to a memory. The memory is configured to store a program or instructions. When the program or the instructions are executed by the processor, the chip system is enabled to implement the method in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software codes stored in the memory.

Optionally, there may alternatively be one or more memories in the chip system. The memory may be integrated with the processor, or may be disposed separately from the processor. This is not limited in this application. For example, the memory may be a non-transitory processor, for example, a read-only memory ROM. The memory and the processor may be integrated on a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

An embodiment of this application further provides a computer-readable storage medium, including instructions or a computer program. When the instructions or the computer program is run on a computer, the computer is enabled to perform the method for implementing service path detection provided in the foregoing embodiments.

An embodiment of this application further provides a computer program product including instructions or a computer program. When the computer program product runs on a computer, the computer is enabled to perform the method for implementing service path detection provided in the foregoing embodiments.

In the specification, claims, and accompanying drawings of this application, terms "first", "second", "third", "fourth", and the like (if existent) are intended to distinguish between similar objects but do not necessarily indicate a specific order or sequence. It should be understood that data used in such a way may be interchangeable in appropriate circumstances, so that embodiments described herein can be implemented in an order other than the content illustrated or described herein. In addition, terms such as "include", "have", and any variations thereof are intended to cover non-exclusive inclusions. For example, a process, method, system, product, or device that includes a series of steps or units is not necessarily limited to those clearly listed steps or units, but may include other steps or units that are not clearly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical service division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, service units in embodiments of this application may be integrated into one processing unit, or each of the units may exist alone physically, or two or more units are integrated into one unit. The integrated unit may be implemented in a form of hardware, or may be implemented in a form of a software service unit.

When the integrated unit is implemented in the form of a software service unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes various media that can store program code, for example, a USB flash drive, a removable hard disk, a read-only memory (ROM), a random access memory (RAM), a magnetic disk, and an optical disc.

Persons skilled in the art should be aware that in one or more of the foregoing examples, the service described in the present invention may be implemented by using hardware, software, firmware, or any combination thereof. When the services are implemented by using software, the foregoing services may be stored in a computer-readable medium or transmitted as one or more instructions or code on the computer-readable medium. The computer-readable medium includes a computer storage medium and a communication medium, where the communication medium includes any medium that facilitates transmission of a computer program from one place to another. The storage medium may be any available medium accessible to a general-purpose or dedicated computer.

The objectives, technical solutions, and beneficial effects of the present invention are further described in detail in the foregoing specific implementations. It should be understood that the foregoing is merely specific implementations of the present invention.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A network device, applied to a first network device in a segment routing over internet protocol version 6 (SRv6) network, the network device comprising:
   at least one processor;
   one or more non-transitory memories coupled to the at least one processor and storing programming instructions, wherein the programming instructions, when executed by the at least one processor, cause the network device to:
   generate a first packet based on an internet protocol version 6 (IPv6), wherein the first packet comprises a first indication and identification information of a service, and wherein the service is a virtual private wire service (VPWS), the identification information of the service is a virtual private network segment identifier (VPN SID) to identify the service, and the first indication indicates that the first packet is a detection packet; and
   send the first packet to a second network device, to indicate to the second network device that receives the first packet to detect, based on the first indication and the identification information of the service, a path to carry the service, the path being at least one of a first path between the first network device and the second network device or a second path between the second network device and an access-side network device.

2. The network device according to claim 1, wherein the first indication is carried in a first IPV6 header or a first IPV6 extension header of the first packet.

3. The network device according to claim 2, wherein
the first packet comprises the first IPV6 header, and the first indication is carried in a next header field in the first IPV6 header; or
the first packet comprises the first IPV6 extension header, and the first indication is carried in a next header field in a first segment routing header (SRH) of the first IPV6 extension header.

4. The network device according to claim 3, wherein the first IPV6 extension header of the first packet further comprises an alert label and a control word, the alert label and the control word indicate detection information in a payload of the first packet, and the detection information indicates to the second network device to detect, based on the detection information, the path for carrying the service.

5. The network device according to claim 2, wherein
the first packet comprises the first IPV6 header, and the first indication is carried in an arguments (args) field in a first destination address (DA) field in the first IPv6 header; or
the first packet comprises the first IPv6 extension header, and the first indication is carried in an args field in a first DA field in a first segment routing header (SRH) of the first IPV6 extension header.

6. The network device according to claim 2, wherein the first packet comprises the first IPV6 extension header, and the first indication is carried in a flags field in a segment routing header (SRH) of the first IPV6 extension header.

7. The network device according to claim 2, wherein the first packet comprises the first IPV6 extension header, and the first indication is carried in a type-length-value (TLV) field in a hop-by-hop (HBH) option header of the first IPV6 extension header, or carried in a TLV field in a destination option header (DOH) of the first IPV6 extension header.

8. The network device according to claim 1, wherein the programming instructions, when executed by the at least one processor, further cause the network device to:
when the first network device does not receive a response packet of the second network device for the first packet within a preset duration, determine that the second path between the first network device and the access-side network device is faulty.

9. The network device according to claim 1, wherein the programming instructions, when executed by the at least one processor, further cause the network device to:
receive a response packet of the second network device for the first packet; and
determine a path status of the second path between the second network device and the access-side network device based on the response packet.

10. The network device according to claim 1, wherein the programming instructions, when executed by the at least one processor, further cause the network device to:
when the first network device determines that the path is faulty based on the first network device not receiving a response packet of the second network device for the first packet within a preset duration, or determines, based on a path status, that the path is faulty or does not meet a path quality requirement, switch to carry the service from the path to a third path between the first network device and a third network device, such that the service is carried by the third network device after switching.

11. The network device according to claim 1, wherein the first packet is a bidirectional forwarding detection (BFD) packet, or the first packet is an operation administration and maintenance (OAM) packet.

12. A network device, applied to a second network device in a segment routing over internet protocol version 6 (SRv6) network, the network device comprises:
at least one processor;
one or more non-transitory memories coupled to the at least one processor and storing programming instructions, wherein the programming instructions, when executed by the at least one processor, cause the network device to:
receive a first packet sent by a first network device, wherein the first packet comprises a first indication and identification information of a service, and wherein the service is a virtual private wire service (VPWS), the identification information of the service is a virtual private network segment identifier (VPN SID) to identify the service, and the first indication indicates that the first packet is a detection packet; and
detect a path to carry the service based on the first indication and the identification information of the service, the path being at least one of a first path between the first network device and the second network device or a second path between the second network device and an access-side network device.

13. The network device according to claim 12, wherein the first packet is a bidirectional forwarding detection (BFD) packet, or the first packet is an operation administration and maintenance (OAM) packet.

14. A network system, wherein the network system is applied to a segment routing over internet protocol version 6 (SRv6) network, and the network system comprises a first network device and a second network device, wherein
the first network device is configured to: generate a first packet based on an internet protocol version 6 (IPv6), and send the first packet to the second network device, wherein the first packet comprises a first indication and identification information of a service, and wherein the service is a virtual private wire service (VPWS), the identification information of the service is a virtual private network segment identifier (VPN SID) to identify the service, and the first indication indicates that the first packet is a detection packet; and
the second network device is configured to: receive the first packet sent by the first network device, and detect, based on the first indication and the identification information of the service, a path to carry the service, the path being at least one of a first path between the first network device and the second network device or a second path between the second network device and an access-side network device.

15. The network system according to claim 14, wherein the first network device is further configured to send a second packet to the second network device, wherein the second packet is a service packet carrying the service, and the second packet does not comprise the first indication.

16. The network system according to claim 14, further comprising a virtual leased line (VLL) or a virtual private local area network service (VPLS) deployed between the first network device and the second network device.

17. The network system according to claim 14, wherein the first packet is a bidirectional forwarding detection (BFD) packet, or the first packet is an operation administration and maintenance (OAM) packet.

18. The network system according to claim 14, wherein the first indication is carried in a first IPV6 header or a first IPv6 extension header of the first packet.

19. The network system according to claim 18, wherein
the first packet comprises the first IPV6 header, and the
first indication is carried in a next header field in the
first IPv6 header; or the first packet comprises the first IPV6 extension header, and the first indication is carried in a next header field in a first segment routing header SRH of the first IPV6 extension header.

20. The network system according to claim 19, wherein the first IPv6 extension header of the first packet further comprises an alert label and a control word, the alert label and the control word indicate detection information in a payload of the first packet, and the detection information indicates the second network device to detect, based on the detection information, the path for carrying the service.

* * * * *